US012594849B2

(12) United States Patent
Matsui

(10) Patent No.: US 12,594,849 B2
(45) Date of Patent: Apr. 7, 2026

(54) OVERHEAD CHARGING APPARATUS FOR ELECTRIC VEHICLES

(71) Applicant: Honda Motor Co., Ltd., Tokyo (JP)

(72) Inventor: Ryuta Matsui, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 622 days.

(21) Appl. No.: 18/159,602

(22) Filed: Jan. 25, 2023

(65) Prior Publication Data

US 2024/0246439 A1 Jul. 25, 2024

(51) Int. Cl.
*B60L 53/37* (2019.01)
*B60L 53/16* (2019.01)
*B60L 53/18* (2019.01)
*B65H 75/44* (2006.01)
*H02J 7/70* (2026.01)

(52) U.S. Cl.
CPC .............. *B60L 53/37* (2019.02); *B60L 53/16* (2019.02); *B60L 53/18* (2019.02); *B65H 75/446* (2013.01); *B65H 75/4484* (2013.01); *H02J 7/70* (2026.01); *B65H 2701/34* (2013.01)

(58) Field of Classification Search
CPC .......... B60L 53/37; B60L 53/16; B60L 53/18; H02J 7/0042
USPC ....................................................... 320/109
See application file for complete search history.

(56) References Cited

U.S. PATENT DOCUMENTS

| | | | | |
|---|---|---|---|---|
| 9,365,115 B2* | 6/2016 | Ferrel | .................... | B60L 58/12 |
| 9,902,276 B2* | 2/2018 | Bianco | .................... | B60L 53/31 |
| 10,227,016 B2* | 3/2019 | Sychov | .................... | B60L 53/18 |
| 2011/0074351 A1* | 3/2011 | Bianco | .................... | B60L 53/31 |
| | | | | 320/109 |
| 2017/0080813 A1 | 3/2017 | Bedell et al. | | |
| 2017/0158072 A1* | 6/2017 | Sychov | .................... | B60L 53/36 |
| 2017/0267114 A1* | 9/2017 | Bianco | .................... | B60L 53/18 |
| 2021/0053452 A1* | 2/2021 | Jeong | .................... | H02G 11/02 |

(Continued)

FOREIGN PATENT DOCUMENTS

| | | |
|---|---|---|
| CN | 204030683 U | 12/2014 |
| CN | 106183862 A | 12/2016 |
| CN | 205890582 U | 1/2017 |

(Continued)

*Primary Examiner* — Suchin Parihar
(74) *Attorney, Agent, or Firm* — Joshua Freier; American Honda Motor Co., Inc.

(57) ABSTRACT

An overhead charging apparatus and method for charging electric vehicles using the overhead charging apparatus is provided. The charging apparatus includes a control assembly, a power supply unit, and an electronic device. The control assembly includes a support structure, a cable holding unit, and an actuation mechanism. The power supply unit includes an electric cable having an end coupled to a charging connector. A portion of the electric cable is disposed in a cable passage of the cable holding unit. The end of the electric cable retractably extends from the cable passage to a first location. The electronic device, coupled to the actuation mechanism, transmits an input to the actuation mechanism to displace the portion of the electric cable from the cable passage such that the end of the electric cable moves from the first location to a second location proximal to a charging port of an electric vehicle.

18 Claims, 12 Drawing Sheets

(56)             References Cited

U.S. PATENT DOCUMENTS

| | | | | |
|---|---|---|---|---|
| 2024/0246439 | A1* | 7/2024 | Matsui ................. | B65H 75/446 |
| 2025/0042281 | A1* | 2/2025 | Matsui ................... | B60L 53/18 |

FOREIGN PATENT DOCUMENTS

| | | |
|---|---|---|
| CN | 205951739 U | 2/2017 |
| CN | 111546918 A | 8/2020 |
| CN | 113506403 A | 10/2021 |
| JP | 2010110053 A | 5/2010 |
| JP | 2019140782 A | 8/2019 |
| KR | 20200118522 A | 10/2020 |
| KR | 102278902 B1 | 7/2021 |
| KR | 102356649 B1 | 2/2022 |

* cited by examiner

600

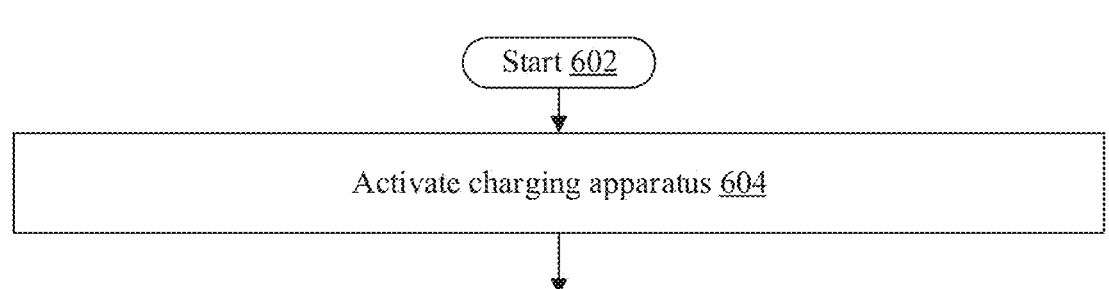

Start <u>602</u>

Activate charging apparatus <u>604</u>

Transmit first input to actuation mechanism of charging apparatus, which causes actuation mechanism to displace portion of electric cable from cable passage of charging apparatus such that first end of electric cable moves from first location to second location that is proximal to location of charging port of electric vehicle <u>606</u>

End

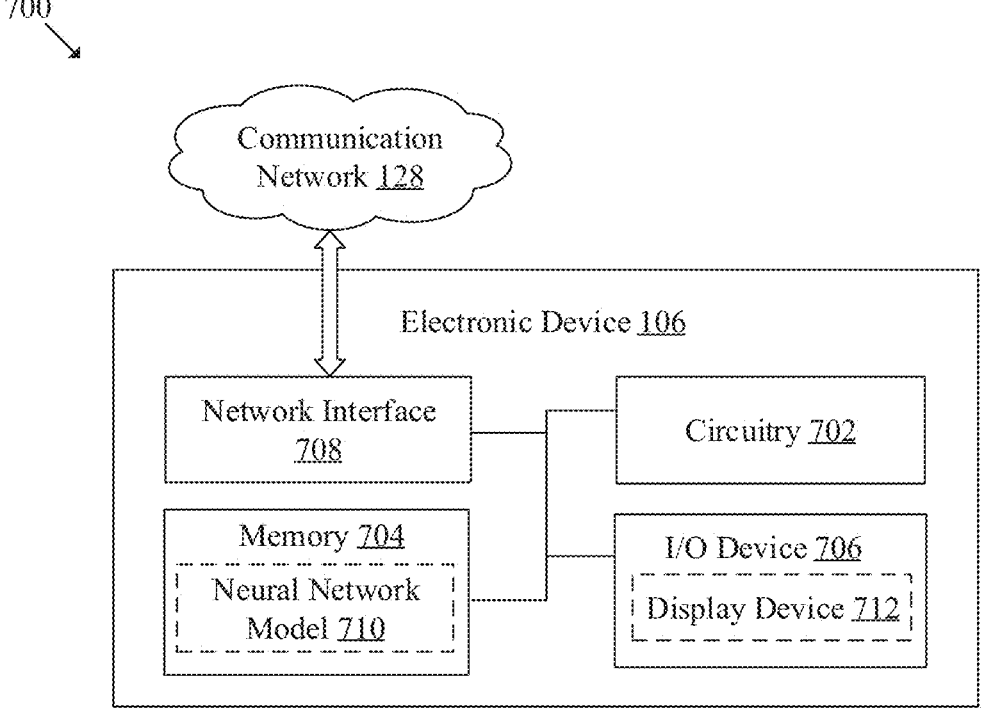

Communication Network <u>128</u>

Electronic Device <u>106</u>

Network Interface <u>708</u>

Circuitry <u>702</u>

Memory <u>704</u>

Neural Network Model <u>710</u>

I/O Device <u>706</u>

Display Device <u>712</u>

FIG. 7

OVERHEAD CHARGING APPARATUS FOR ELECTRIC VEHICLES

BACKGROUND

Charging technology advancements have resulted in an improvement in the existing charging infrastructure for electric vehicles (EVs). A charging station, also known as an Electric Vehicle Supply Equipment (EVSE), is commonly used to provide electricity to charge an electric vehicle. Typically, the EVSE may be mounted on a wall of a parking space or may be disposed on the floor of a parking space. It may be necessary to park the electric car near enough to the EVSE for the charging connector to fit into the charging socket. The placement of the charging port may change depending on the make or size of the car. The positioning of some vehicles' charging ports may make it challenging for a user to maneuver and attach the charging connectors to the charging ports. For instance, the charging outlet may be on the right side of the electric vehicle, but the EVSE may be on the left. Many customers may find it difficult to park their vehicles in locations that are ideal for attaching the EVSE's charging port.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an overhead charging apparatus for charging of electric vehicles is provided. The charging apparatus may include a control assembly. The control assembly may include a support structure and a cable holding unit disposed on the support structure. The support structure may be disposed at a height above a floor surface. The cable holding unit may include a cable passage. The control assembly may further include an actuation mechanism that may be coupled to the cable holding unit. In addition to the control assembly, the charging apparatus may include a power supply unit that includes an electric cable. The electric cable may include a first end electrically coupled to a charging connector. A first portion of the electric cable may be disposed in the cable passage such that the first end of the electric cable retractably extends from the cable passage to a first location. The control assembly may further include an electronic device that may be communicatively coupled to the actuation mechanism. The electronic device may be configured to transmit a first input to the actuation mechanism. The first input may cause the actuation mechanism to displace the first portion of the electric cable from the cable passage. The displacement may be such that the first end of the electric cable moves from the first location to a second location that may be proximal to a location of a charging port of an electric vehicle.

According to an embodiment of the disclosure, an overhead charging apparatus for charging of electric vehicles is provided. The charging apparatus may include a control assembly, a power supply unit, and an electronic device. The control assembly may include a support structure and a cable holding unit disposed on the support structure. The support structure may be disposed at a height above a floor surface. The cable holding unit may include a cable passage. The control assembly may further include an actuation mechanism that may be coupled to the cable holding unit. The power supply unit may include an electric cable. The electric cable may include a first end electrically coupled to a charging connector. The electric cable may include a first portion that may be disposed in the cable passage such that the first end of the cable retractably extends from the cable passage to a first location. The electronic device may be communicatively coupled to the actuation mechanism.

According to another embodiment of the disclosure, a method for charging an electric vehicle via an overhead charging apparatus is provided. The method may include activating the charging apparatus. The charging apparatus may include a control assembly. The control assembly may include a support structure and a cable holding unit that may be disposed on the support structure. The support structure may be disposed at a height above a floor surface. The cable holding unit may include a cable passage. The control assembly may further include an actuation mechanism that may be coupled to the cable holding unit. The charging apparatus may further include a power supply unit comprising an electric cable. The electric cable may include a first end electrically coupled to a charging connector. The electric cable may include a first portion that may be disposed in the cable passage such that the first end of the electric cable retractably extends from the cable passage to a first location. The charging apparatus may further include an electronic device that may be communicatively coupled to the actuation mechanism. The method may further include transmitting a first input to the actuation mechanism. The first input may cause the actuation mechanism to displace the first portion of the electric cable from the cable passage such that the first end of the electric cable moves from the first location to a second location that may be proximal to a location of a charging port of an electric vehicle.

BRIEF DESCRIPTION OF THE DRAWINGS

FIG. 6 is a flowchart that illustrates exemplary operations for charging of an electric vehicle using an overhead charging apparatus, in accordance with an embodiment of the disclosure.

FIG. 7 is a block diagram that illustrates an exemplary electronic device in an overhead charging apparatus, in accordance with an embodiment of the disclosure.

Figure 1:
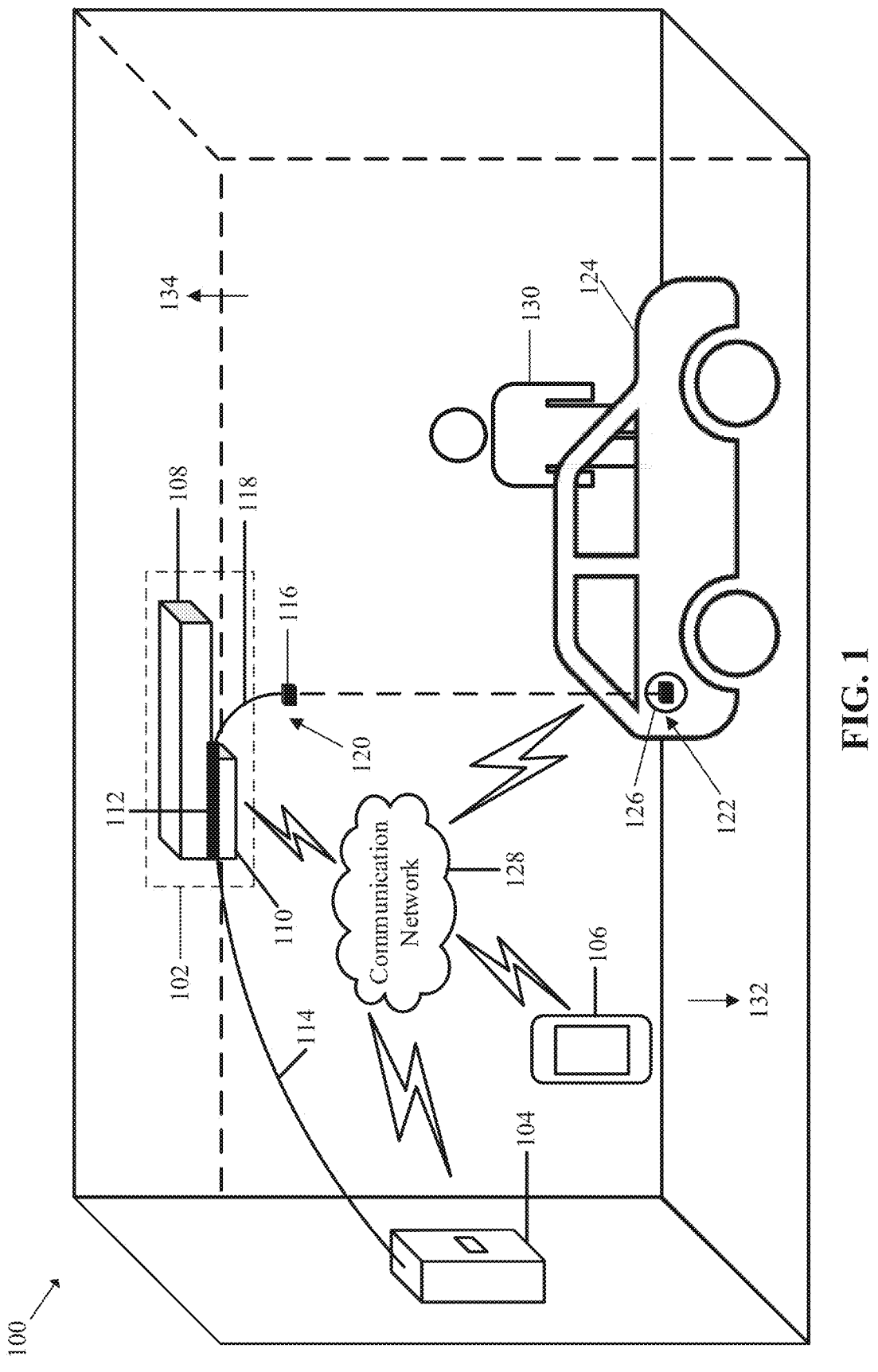
FIG. 1 is a diagram that illustrates an exemplary environment that includes a charging apparatus for charging of electric vehicles, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed overhead charging apparatus and method for charging of electric vehicles by use of the overhead charging apparatus. The charging apparatus may include a control assembly. The control assembly may include a support structure (for example, a roof structure or a horizontal structure that may be parallel to the roof structure and floor). The support structure may be disposed at a height above a floor surface. The control assembly may further include a cable holding unit (for example, a spool that includes two rims or an arm that includes a series of jointed segments) disposed on the support structure. The cable holding unit may include a cable passage (for example, a space between two rims of a spool or a space that extends along a length of an arm (e.g., a robotic arm)). The control assembly may further include an actuation mechanism (for example, a servo motor and a joint) coupled to the cable holding unit. The charging apparatus may further include a power supply unit (for example, an electric vehicle supply equipment) that includes an electric cable. A first end of the electric cable may be electrically coupled to a charging connector (for example, an alternating current (AC) connector or a direct current (DC) connector). Further, a first portion of the electric cable may be disposed in the cable passage such that the first end of the electric cable retractably extends from the cable passage to a first location (a location below the cable passage). The charging apparatus may further include an electronic device that may be communicatively coupled (via a wired or wireless means) to the actuation mechanism. The electronic device may be configured to transmit a first input (for example, an electrical signal or an electronic signal) to the actuation mechanism. The first input may cause the actuation mechanism to displace the first portion of the electric cable from the cable passage such that the first end of the electric cable moves from the first location to a second location that may be proximal to a location of a charging port of an electric vehicle.

Conventionally, an electric vehicle has to be parked close to a charging station to charge a battery pack of the electric vehicle. This has to be done because the charging station may have a charging connector constrained by the length of an electric charging cable of the charging station (which may be limited). The length of the electric charging cable may further limit a number of electric vehicles that may be charged simultaneously at the charging station, since an electric vehicle that is being charged may occupy a significant amount of space in proximity of the charging station (particularly if the electric vehicle is a heavy vehicle such as a truck). There may not be sufficient space in the proximity of the charging station for charging additional electric vehicles, even if the charging station has unoccupied charging spots.

Further, the charging station may be mounted on a wall of a parking space or may be disposed on the floor of a parking space. The electric vehicle may be required to be parked close to the charging station such that a charging connector of the charging station can be attached to a charging port of the electric vehicle. This may be challenging in some scenarios based on the positioning of the charging port of the electric vehicle. For example, if the charging port is positioned on the left side of the electric vehicle and the electric vehicle is parked such that right side of the electric vehicle is close to or facing the charging connector, then it may be cumbersome or difficult in some instances to maneuver the charging connector towards the charging port.

To address all such issues, the disclosed charging apparatus may provide a mechanism that allows overhead placement of a charging apparatus. For example, the charging apparatus may be positioned on a roof or a similar structure substantially above a floor surface of an environment. The charging apparatus may include an electric cable such that an end of the electric cable is connected to a charging connector and may be maneuvered remotely using an actuation mechanism. Operators or drivers may remotely trigger or control movement of the electric charging cable of the charging stations. The charging apparatus may allow drivers or operators of the charging apparatus to remotely extend or retract the electric charging cable. For instance, the charging apparatus may be remotely controlled to extend the electric charging cable from an overhead location that is proximal to the charging station to a location that is proximal to a charging port of an electric vehicle, instead of driving the electric vehicle towards a charging spot of the charging station. The extension of the electric charging cable may increase reach of the charging station. The electronic device may be used to send control signals to actuators in the charging apparatus for guiding a charging connector, coupled to an end of the electric charging cable, to the proximal location of the charging port.

Further, the charging apparatus may be remotely controlled to retract the electric charging cable from the proximal location of the charging point to the overhead location. The retraction of the electric charging cable to the overhead location may prevent occurrence of any undesirable contact between the charging connector and drivers (or operators at the charging station), or the electric vehicles that may cause scratches or dents on the surfaces of the electric vehicles.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an exemplary environment that includes a charging apparatus for charging of electric vehicles, in accordance with an embodiment of the disclosure. With reference to FIG. 1, there is shown an exemplary environment 100. Examples of the environment 100 may include, but are not limited to, a garage, a residential (or private) parking space, or a commercial parking space. In the exemplary environment 100, there is shown a charging apparatus. The charging apparatus may include a control assembly 102, a power supply unit 104, and an electronic device 106. The control assembly 102 may include a support structure 108, a cable holding unit 110, and an actuation mechanism 112. The power supply unit 104 may include an electric cable 114. A first end of the electric cable 114 may be electrically coupled to a charging connector 116 and a second end of the electric cable 114 may be electrically coupled to the power supply unit 104.

In the environment 100, there is further shown an electric vehicle 124 and a charging port 126 of the electric vehicle 124. The electronic device 106 may be communicatively coupled to the power supply unit 104 and the actuation mechanism 112, via a communication network 128. There is further shown a user 130 who may be associated with the electronic device 106. The electronic device 106 may transmit inputs to the control assembly 102 to control a movement of actuators of the actuation mechanism 112.

Figure 2A:
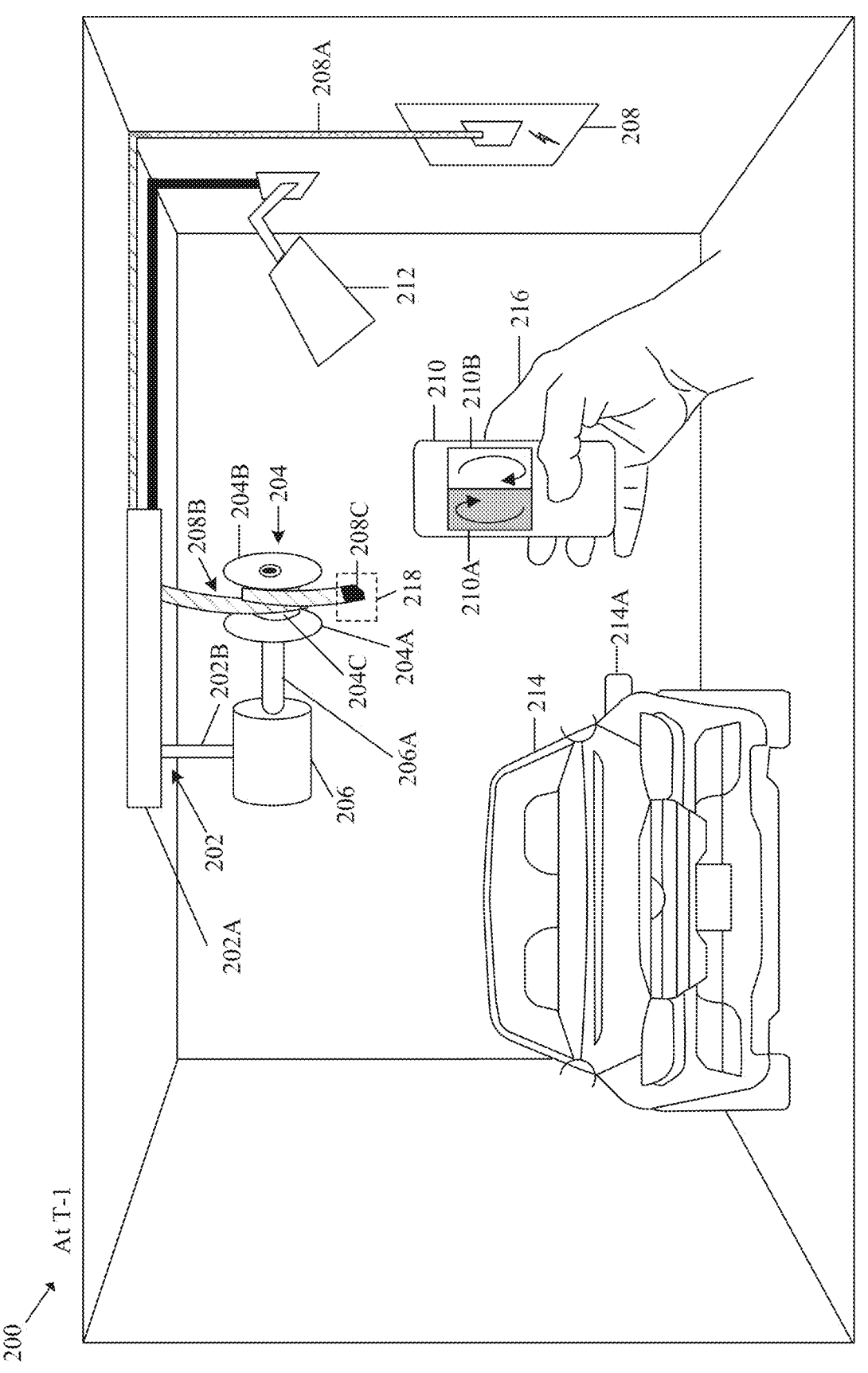
FIGS. 2A and 2B are diagrams that collectively illustrate an operation of an charging apparatus for charging of an electric vehicle, in accordance with an embodiment of the disclosure.
Figure 2B:
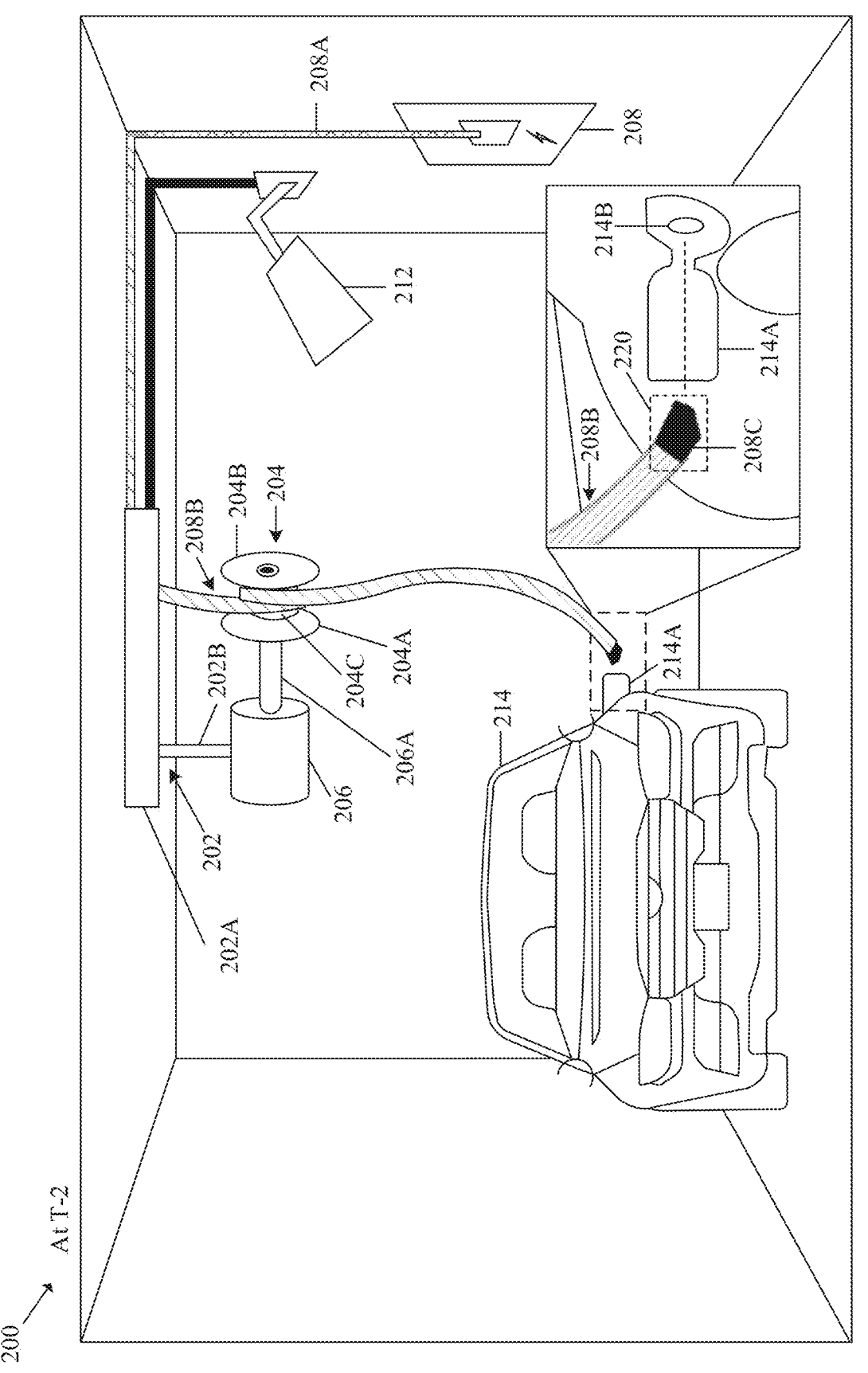

The support structure 108 may be disposed at a height above a floor 132 of the environment 100. In accordance with an embodiment, the support structure 108 may be disposed on a roof structure 134 of the environment 100 or a horizontal structure that may be different from the roof structure 134 (e.g., a structure that is substantially parallel to the roof structure 134 and the floor 132). Examples of the support structure 108 include, but are not limited to, a bracket (such as a mountable bracket), an articulating wall mount, a tilting wall mount, a holder, a side stand, an attachment panel, a support stand, a hook, and a frame. The cable holding unit 110 may be disposed on the support structure 108. The support structure 108 may physically support the cable holding unit 110. The support structure 108 may act as a mount for the cable holding unit 110 and may support the weight of the cable holding unit 110 against one or more structural members, such as a wall, a floor, a ceiling, a table, a rod, a wire, or a stand in the environment 100. The cable holding unit 110 may include a cable passage (as shown in FIGS. 2A and 2B, for example).

The first portion 118 of the electric cable 114 may be disposed in the cable passage. In accordance with an embodiment, the first portion 118 may be in contact with the cable holding unit 110. The cable passage may store the first portion 118 and may support the weight of the first portion 118 of the electric cable 114. Examples of the cable holding unit 110 may include, but are not limited to, a spool comprising a plurality of rims or an arm with a series of jointed segments.

The actuation mechanism 112 may be coupled to the cable holding unit 110. The actuation mechanism 112 may include a motor or a set of actuators. The actuation mechanism 112 may displace the first portion 118 of the electric cable 114 (disposed inside the cable holding unit 110) based on inputs from the electronic device 106. The displacement of the first portion 118 of the electric cable 114 may be based on a motion or movement (maneuver) of the cable holding unit 110 (or the cable passage) that may be controlled by the actuation mechanism 112.

The power supply unit 104 may be an electric vehicle supply equipment that may supply electric power via the electric cable 114. The electric power may be used to charge a battery pack of the electric vehicle 124. The power supply unit 104 may be an AC power source or a DC power source that may deliver the electric power to the electric vehicle 124 via the charging connector 116 electrically coupled to the first end of the electric cable 114. The charging connector 116 may be (automatically or manually) connected to the charging port 126 of the electric vehicle 124 to charge the battery pack of the electric vehicle 124. Merely as an example, the charging apparatus is shown (in FIG. 1) to include a single electric cable 114 and a charging connector 116. In some embodiments, the power supply unit 104 may include any number of electric cables, each of which may be electrically coupled to a respective charging connector (such as the charging connector 116).

The electronic device 106 may include suitable logic, circuitry, interfaces, and/or code that may be configured to transmit inputs to the actuation mechanism 112. The inputs may be transmitted to trigger the actuation mechanism 112 to displace the first portion 118 of the electric cable 114 such that the first end of the electric cable 114 (electrically coupled to the charging connector 116) may extend or retract from one location (for example, the first location 120) to another (for example, the second location 122). The actuation mechanism 112 may control based on an input (received from the electronic device 106), a movement (i.e., direction of motion of a motor or direction of maneuver of a jointed arm) of the cable holding unit 110 (or the cable passage). The movement of the cable holding unit 110 may cause a displacement of the first portion 118 of the electric cable 114 or the cable passage along with the first portion 118.

The electronic device 106 may be further configured to store information associated with the power supply unit 104. The information may include, for example, a capability of the power supply unit 104 to provide AC charging or DC fast charging and or a number of charging connectors supported by the power supply unit 104. The electronic device 106 may receive the information from the power supply unit 104. The electronic device 106 may be further configured to receive information (for example, a request for a vehicle charging service, a capacity of battery pack of an electric vehicle to be charged, or a current state of charge of the battery pack) from the electric vehicle 124. The electronic device 106 may transmit information (for example, messages indicative of initiation or completion of charging of the battery pack, an instance of completion of charging of the battery pack, or an instantaneous state of charge of the battery pack) to the electric vehicle 124.

The electronic device 106 may transmit the inputs to the actuation mechanism 112 and may exchange information with the power supply unit 104 and/or the electric vehicle 124 via a network interface of the electronic device 106. The network interface may support a wired or wireless communication of the electronic device 106 with the power supply unit 104 and/or the electric vehicle 124. The electronic device 106 may be further configured to display on a display screen associated with the electronic device 106, options for reception of user inputs to be transmitted to the actuation mechanism 112. Additionally, or alternatively, the electronic device 106 may display on the display screen the information received from the power supply unit 104 and the electric vehicle 124 and the information to be transmitted to the electric vehicle 124.

In FIG. 1, the electronic device 106 is shown as a smartphone. The smartphone is merely an example of the electronic device 106. In some embodiments, the functionalities of the electronic device 106 or the display screen may be integrated with the power supply unit 104. In some other embodiments, the electronic device 106 may be integrated with an in-vehicle infotainment system associated with the electric vehicle 124. Examples of the electronic device 106 may include, but may not be limited to, a smartphone, a cellular phone, a tablet, a laptop, a mobile phone, a consumer electronic (CE) device having a display, an Internet of Things (IoT) device, a wearable display, a monitor integrated with a charging station, or an in-vehicle infotainment system.

The electric vehicle 124 may include suitable logic, circuitry, and interfaces that may be configured to transmit to the electronic device 106, requests for charging of a battery pack of the electric vehicle 124. The electric vehicle 124 may receive information associated with a charging status of the battery pack of the electric vehicle 124. The electric vehicle 124 may include one or more sensors that may determine a state of charge of the battery pack. The electric vehicle 124 may transmit the state of charge or a request for the vehicle charging service to the electronic device 106.

The electric vehicle 124 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the electric vehicle 124 may include, but are not limited to, a e-kick scooter, a personal transporter, an electric scooter, an electric unicycle, an electric bicycle, an electric hover board, an electric skateboard, a roller skate, a compact four-wheeler vehicle, a compact three-wheeler vehicle, a two-wheeler vehicle, a wheelchair with an actuator-based driving unit, a hybrid vehicle, or a vehicle with autonomous drive capability. Examples of the compact four-wheeler vehicle may include, but are not limited to, an electric car, an internal combustion engine (ICE)-based car, a fuel-cell based car, a solar powered-car, or a hybrid car. Similarly, examples of the two-wheeler vehicle may include, but are not limited to, an electric two-wheeler, an internal combustion engine (ICE)-based two-wheeler, or a hybrid two-wheeler. The description of other types of the vehicles has been omitted from the disclosure for the sake of brevity.

In accordance with an embodiment, the electric vehicle 124 may include a battery pack which may be a source of electric power for one or more electric circuits or loads in the electric vehicle 124. The battery pack may be recharged by connecting the charging port 126 of the electric vehicle 124 to the charging connector 116. Examples of the battery pack may include, but are not limited to, a lead acid battery, a nickel-cadmium battery, a nickel-metal hydride battery, or a lithium-ion battery.

The communication network 128 may include a communication medium through which the power supply unit 104, the electronic device 106, and the electric vehicle 124, may communicate with each other. The communication network 128 may be one of a wired connection or a wireless connection. Examples of the communication network 128 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN).

In operation, the electronic device 106 may receive an input. The input may be received at an instance T-1. In accordance with an embodiment, the input may be a user input received from the user 130. During the reception of the input, the first portion 118 of the electric cable 114 may be disposed on the cable passage such that the first end of the electric cable 114 may retractably extend from the cable passage (of the cable holding unit 110) to the first location 120. The height of the first location 120 may be, for example, more than the height of the electric vehicle 124 but less than the height of the control assembly 102. Based on the received input, the electronic device 106 may transmit an input to the actuation mechanism 112. At an instance T-2, the transmitted input may cause the actuation mechanism 112 to displace the first portion 118 of the electric cable 114 from the cable passage. The displacement may be such that the first end of the electric cable 114 may move from the first location 120 to the second location 122. The second location 122 may be proximal to a location of the charging port 126 of the electric vehicle 124. The charging connector 116 may be horizontally aligned with the location of the charging port 126 of the electric vehicle 124 at the second location 122. Once the charging connector 116 is horizontally aligned with the charging port 126, the user 130 may connect the charging connector 116 to the charging port 126 to charge a battery pack of the electric vehicle 124.

In some embodiments, the electronic device 106 may transmit the input to the actuation mechanism 112 based on a state of a charging lid of the charging port 126. The electronic device 106 may detect a transition in the state of the charging lid from a locked state to an unlocked state. The detection may be based on a reception of a signal from the electric vehicle 124 about the transition of the state. Based on the detection, the electronic device 106 may transmit the input to the actuation mechanism 112 such that the first end of the electric cable 114 moves to the second location 122 and the charging connector 116 is horizontally aligned with the charging port 126.

FIGS. 2A and 2B are diagrams that collectively illustrate an operation of a charging apparatus for charging of an electric vehicle, in accordance with an embodiment of the disclosure. FIGS. 2A and 2B are explained in conjunction with elements from FIG. 1. With reference to FIGS. 2A and 2B, there is shown diagrams of an environment 200. The environment 200 is shown at two instances T-1 and T-2. Examples of the environment 200 may include a garage, a parking lot, or a roadside space with a charging station. The environment 200 may host a charging apparatus. The charging apparatus may include a support structure 202, a cable holding unit 204 (for example, a spool), an actuation mechanism 206 (for example, a motor), a power supply unit 208 (for example, an electric vehicle supply equipment (EVSE)), an electronic device 210, and an imaging sensor 212. The electronic device 210 may be an exemplary implementation of the electronic device 106 of FIG. 1 and a functionality of the electronic device 210 may be identical to that of the electronic device 106. In FIG. 2, the charging apparatus is shown to include an imaging sensor 212. However, the disclosure may not be limited to a single image sensor. The charging apparatus may include multiple imaging sensors. In at least one embodiment, the imaging sensors may be integrated into the electronic device 210.

In the environment 200, there is further shown an electric vehicle 214 and a user 216 associated with the electronic device 210. The electric vehicle 214 may include a charging lid 214A and a charging port 214B (as shown in the exemplary scenario 200B in FIG. 2B).

In accordance with an embodiment, the support structure 202 may include a horizontal portion 202A and a vertical portion 202B. The cable holding unit 204 may be a spool that includes rims, viz., a first rim 204A and a second rim 204B on two distal ends of the spool. Space between the rims (i.e., the first rim 204A and the second rim 204B) may act as a cable passage 204C. The actuation mechanism 206 may be coupled to a spindle 206A. The power supply unit 208 may include an electric cable 208A. A first portion 208B of the electric cable 208A may be disposed in the cable passage 204C. Further, a first end of the electric cable 208A may be electrically coupled to a charging connector 208C and a second end of the electric cable 208A may be electrically coupled to the power supply unit 208. The first portion 208B of the electric cable 208A may be displaced from a first location 218 to a second location 220 (as shown in the exemplary scenario 200B in FIG. 2B) based on a rotation of the spool (i.e., the cable holding unit 204). The rotation may be controlled by the actuation mechanism 206.

In accordance with an embodiment, the horizontal portion 202A of the support structure 202 may be disposed on a roof structure of the environment 200. In some embodiments, the horizontal portion 202A may be disposed on a horizontal structure that may be different from the roof structure. The horizontal structure may be substantially parallel to the roof structure and a floor of the environment 200. The vertical portion 202B may be disposed on the horizontal portion 202A. The spool (i.e., the cable holding unit 204) may be disposed on the support structure 202 and may be in contact with the actuation mechanism 206 via the spindle 206A. The actuation mechanism 206 may be coupled with the spool (i.e., the cable holding unit 204) and disposed on the vertical portion 202B. The support structure 202 may act as a mount for the spool (i.e., the cable holding unit 204) and the actuation mechanism 206.

In accordance with an embodiment, the actuation mechanism 206 may be configured to engage with the cable holding unit 204 (i.e., the spool) via the spindle 206A. The actuation mechanism 206 may include a motor (for example, a servo motor) that may rotate in a particular direction (anticlockwise or clockwise) based on a control signal from the electronic device 210. The rotation of the motor may cause the spindle 206A to rotate, which, in turn, may cause the spool to rotate. This may be due to a coupling of the motor (i.e., the actuation mechanism 206) with the spool (i.e., the cable holding unit 204) via the spindle 206A.

At time instant T-1, the first portion 208B of the electric cable 208A may be disposed in the cable passage 204C such that the first end of the electric cable 208A retractably extends from the cable passage 204C to the first location 218. The height of the first location 218 may be, for example, more than the height of the electric vehicle 214 but less than the height of the support structure 202. The extension of the first end of the electric cable 208A to the first location 218 may ensure that any unwanted contact between the charging connector 208C and the body of the electric vehicle 214 is avoided while the electric vehicle 214 is parked in the environment 200 and is not being charged. The first portion 208B of the electric cable 208A may correspond to an excess portion that may be stored in the cable passage 204C by wrapping the first portion 208B around a cylindrical core of the cable holding unit 204. The first portion 208B may extend from the cable passage 204C to a cable end that connects to the charging connector 208C. The remaining portion of the electric cable 208A may be disposed on the roof structure or other structures in the environment 200 to reach a power socket of the power supply unit 208.

In accordance with an embodiment, the electronic device 210 (for example, a smartphone) may be configured to receive a selection of an option to move the charging connector 208C towards the charging port 214B of the electric vehicle 214. The selection may be received based on a user input from the user 216. The electronic device 210 may control a display screen of the electronic device 210 to render a user interface for reception of the user input. For example, the user input may be a selection of a user interface element 210A (i.e., the option) on the display screen of the electronic device 210. The user input may indicate that the first end of the electric cable 208A needs to be moved down from the first location 218 such that the charging connector 208C is proximal to a location of the charging port 214B of the electric vehicle 214.

Based on the user input, the electronic device 210 may be configured to control the imaging sensor 212 to acquire an image of the electric vehicle 214. The imaging sensor 212 may capture an image of the electric vehicle 214 and may transmit the image to the electronic device 210. The imaging sensor 212 may be required to include the charging port 214B of the electric vehicle 214 in a field-of-view of the imaging sensor 212 while capturing the image.

The electronic device 210 may be further configured to determine the location of the charging port 214B of the electric vehicle 214 based on the captured image (that may be received from the imaging sensor 212). The location of the charging port 214B may be converted from in-image coordinates (i.e., a location in the image) to 3D coordinates (i.e., real-world coordinates) for a 3D localization of the charging port 214B in the environment 200 with respect to an origin. The origin may be, for example, a default location (i.e., the first location 218) of the charging connector 208C at the time instant T-1.

To determine the 3D coordinates of the charging port 214B, the electronic device 210 may recognize attributes associated with the electric vehicle 214 based on the of the captured image. For example, the recognized attributes may include a model of the electric vehicle 214, manufacturer of the model, color of the electric vehicle 214, or size of the electric vehicle 214. The recognition may be based on a vehicle image recognition (i.e., object detection) using a neural network (such as a pre-trained object detector) stored on the electronic device 210. The neural network may be trained based on a dataset that may include images of a set of electric vehicle models associated with various electric vehicle manufacturers. Each image may be annotated with a bounding box and one or more class labels. Based on the training, the neural network may learn from the images included in the dataset, features and attributes associated with the set of electric vehicle models. Once the training of the neural network model is complete, the neural network in an inference stage may recognize features or attributes of an electric vehicle (for example, the electric vehicle 214).

Based on the features or the attributes (for example, the model number and manufacturer of the electric vehicle 214), the electronic device 210 may determine a location of the charging lid 214A (or the charging port 214B) on the electric vehicle 214. For example, the location may correspond to a region on a left rear fender of the electric vehicle 214. In accordance with an embodiment, the electronic device 210 may store a list that includes a location of a charging port for a plurality of electric vehicle models. From the list, the electronic device 210 may retrieve a location of the charging port of an electric vehicle whose attributes match that of the electric vehicle 214. The retrieved location may be determined as a position of the charging port 214B on the electric vehicle 214.

The electronic device 210 may be further configured to translate the location of the charging port 214B into the 3D real-world coordinates. The translation may be based on 3D coordinates of the first location 218 in the environment 200, 3D coordinates of the imaging sensor 212 in the environment 200, and a location (i.e., an in-image location) of the charging lid 214A or the charging port 214B. The 3D coordinates of the charging port 214B in the environment 200 may be determined as the location of the charging port 214B of the electric vehicle 214.

At time instant T-2, the electronic device 210 may be configured to generate a first input based on the determined location (i.e., the location of the charging port 214B). The first input may control a downward displacement of the first portion 208B of the electric cable 208A. In accordance with an embodiment, the electronic device 210 may be configured to transmit the first input to the actuation mechanism 206 (i.e., an electronic controller and a motor communicatively coupled to the electronic controller). The first input may cause the actuation mechanism 206 to displace the first portion 208B of the electric cable 208A from the cable passage 204C such that the first end of the electric cable 208A moves (downwards) from the first location 218 to the second location 220. The second location 220 may correspond to a location that may be proximal to the determined location of the charging port 214B of the electric vehicle 214.

The first input may include a direction of rotation of the spool (i.e., the cable holding unit 204) and the second location 220. For example, the first input may indicate the direction of rotation as clockwise. Based on the first input, the actuation mechanism 206 may control the motor to rotate in a clockwise direction. The rotation of the motor in the clockwise direction may cause the spindle 206A and the spool to rotate in the clockwise direction. The rotation of the spool (i.e., the first rim 204A, the second rim 204B, and the cable passage 204C) in the direction of rotation (as included in the first input) may cause the first end of the electric cable 208A to move downwards in a vertical direction. The downward vertical movement may continue until the first end of the electric cable 208A extends to the second location 220 (as indicated in the first input) which may be proximal to the determined location of a charging port 214B).

At the second location 220, the charging connector 208C may be horizontally aligned with the location of the charging port 214B (or the charging lid 214A). In other words, the spool may continue to rotate (based on the first input) until the charging connector 208C (electrically coupled to the first end of the electric cable 208A) is horizontally aligned with the location of the charging port 214B. Once the charging connector 208C is horizontally aligned with the location of the charging port 214B, the user 216 may connect the charging connector 208C to the charging port 214B to charge a battery of the electric vehicle 214.

In some embodiments, the electronic device 210 may be configured to detect a change in state of the charging lid 214A of the charging port 214B from a locked state to an unlocked state. The detection may be based on reception of a control signal from the electric vehicle 214. The control signal may indicate that the charging lid 214A has transitioned from the locked state to the unlocked state. The electronic device 210 may further transmit the first input to the actuation mechanism 206 based on the detection of the change in the state of the charging lid 214A (from the locked state to the unlocked state).

In accordance with an embodiment, the first input may be transmitted to the actuation mechanism 206 based on reception of a user input. The electronic device 210 may control the display screen to render a user interface for reception of the user input, based on reception of the control signal from the electric vehicle 214. The user interface may render a message that states, "charging lid 214A unlocked", and a user interface element (for example, the user interface element 210A) for the reception of the user input. The user input may be indicative of an instruction to move the first end of the electric cable 208A in the vertical direction towards the charging port 214B. Once the user input is received, the first input may be transmitted. The first input may include the direction of rotation of the spool and the second location 220. The rotation of the spool may cause a displacement of the first portion 208B of the electric cable 208A from the cable passage 204C such the first end of the electric cable 208A moves from the first location 218 to the second location 220 (that is proximal to the charging port 214B).

In accordance with another embodiment, the first input may be transmitted to the actuation mechanism 206 automatically based on detection of the change in the state of the charging lid 214A from the locked state to the unlocked state.

In FIGS. 2A and 2B, the charging apparatus is shown to include a single cable holding unit (i.e., spool), a single electric cable, and a single charging connector. However, the disclosure may not be so limiting. In some embodiments, the charging apparatus may include multiple cable holding units, electric cables, and charging connectors to facilitate simultaneous charging of multiple electric vehicles, without a departure from the scope of the present disclosure.

Figure 2C:
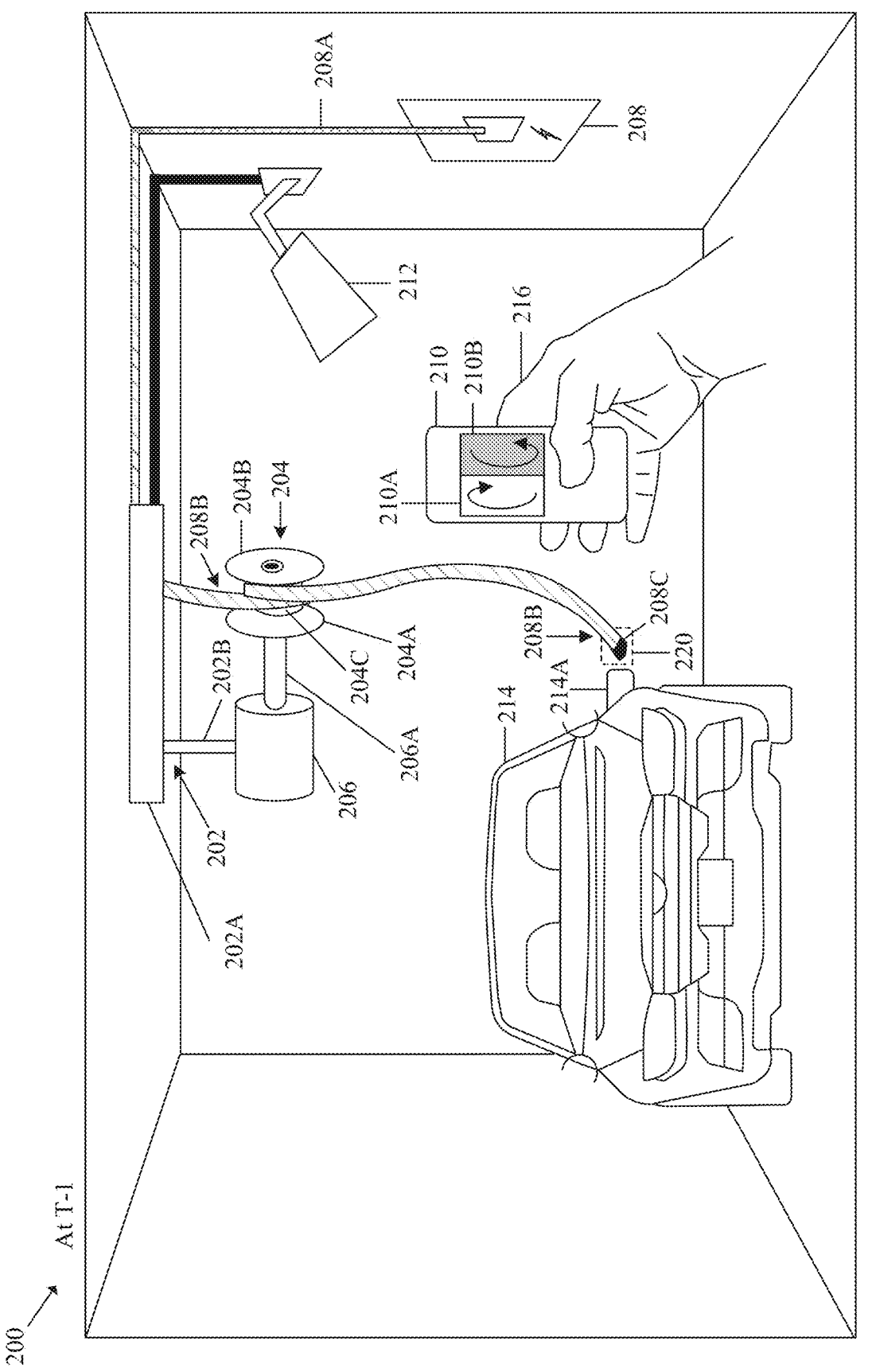
FIGS. 2C and 2D are exemplary scenario diagrams that collectively illustrate a retraction of an end of an electric cable electrically coupled to a charging connector, in accordance with an embodiment of the disclosure.
Figure 2D:
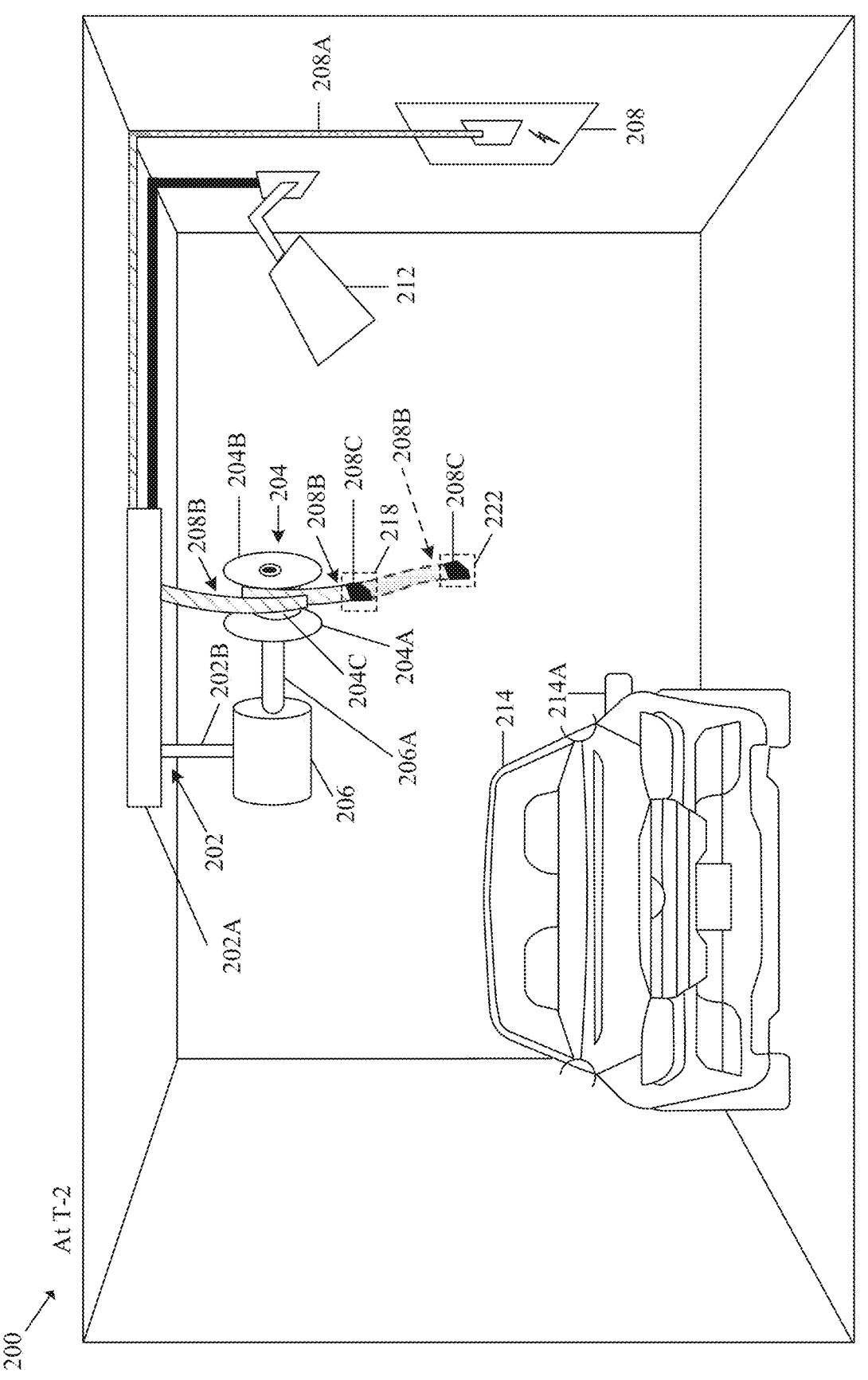

FIGS. 2C and 2D are diagrams that collectively illustrate a retraction of an end of an electric cable electrically coupled to a charging connector, in accordance with an embodiment of the disclosure. FIGS. 2C and 2D are explained in conjunction with elements from FIG. 1, FIG. 2A, and FIG. 2B. With reference to FIGS. 2C and 2D, there is shown diagrams of the environment 200 that includes the charging apparatus of FIGS. 2A and 2B. The environment 200 is shown at two time instances T-1 and T-2.

At time instant T-1, the first portion 208B of the electric cable 208A may be disposed in the cable passage 204C such that the first end of the electric cable 208A retractably extends from the cable passage 204C to the second location 220 (as shown in FIG. 2C).

In accordance with an embodiment, the electronic device 210 may be configured to receive a selection of an option to move the charging connector 208C away the charging port 214B. The selection may be received based on reception of a user input from the user 216. The user input may indicate that the first end of the electric cable 208A needs to be moved upwards in a vertical direction from the second location 220. For example, the user input may be a selection of a user interface element 210B (i.e., the option) on the display screen of the electronic device 210. The electronic device 210 may be configured to control the actuation mechanism 206 to displace the first portion 208B of the electric cable 208A. The first portion 208B of the electric cable 208A may be displaced such that the first end of the electric cable 208A moves upward from the second location 220 to the first location 218 or a third location 222 (as shown in FIG. 2D) away from the charging port 214B. The height of the third location 222 may be, for example, more than the height of the electric vehicle 214 but less than the height of the support structure 202. In some scenarios, the third location 222 may be proximal to a location of a charging port of another electric vehicle.

At time instant T-2, the electronic device 210 may be configured to transmit a second input to the actuation mechanism 206. The second input may cause the actuation mechanism 206 to displace the first portion 208B of the electric cable 208A from the cable passage 204C such that the first end of the electric cable 208A moves (upwards) from the second location 220 to the first location 218 or the third location 222 (that is different from the first location 218 and the second location 220). The second input may include a direction of rotation of the spool (i.e., the cable holding unit 204) and the first location 218 or the third location 222. For example, the second input may indicate the direction of rotation as anticlockwise. The actuation mechanism 206 may control the motor to rotate in an anticlockwise direction based on the second input. The rotation of the motor in the anticlockwise direction may cause the spindle 206A and the spool to rotate in the anticlockwise direction. The rotation of the spool (i.e., the first rim 204A, the second rim 204B, and the cable passage 204C) in the anticlockwise direction may cause the first end of the electric cable 208A to move upwards. The upward movement may continue till the first end of the electric cable 208A retracts to the first location 218 or the third location 222 (as indicated in the second input).

In some embodiments, the electronic device 210 may be configured to detect a disengagement of the charging connector 208C from the charging port 214B (see FIG. 2B). The detection may be based on a reception of a control signal from the electric vehicle 214. The control signal may be indicative of disconnection of the charging connector 208C from the charging port 214B. The control signal may be received when the battery of the electric vehicle 214 is completely charged or charged to a level that may be set by a user of the electric vehicle 214. The electronic device 210 may further transmit the second input to the actuation mechanism 206 based on detection of the disengagement.

In accordance with an embodiment, the second input may be transmitted to the actuation mechanism 206 based on reception of a user input via a user interface rendered on the display screen of the electronic device 210. The user interface may render a message such as, "battery is charged", "charging completed", or "60% charged" (if 60% is the level set by the driver) and a user interface element (for example, the user interface element 210B) for the reception of the user input. The user input may be indicative of an instruction to move the first end of the electric cable 208A away from the charging port 214B. Once the user input is received, the second input may be transmitted. The second input may include the direction of rotation of the spool and the first location 218 or the third location 222. The rotation of the spool may cause a displacement of the first portion 208B of the electric cable 208A such the first end of the electric cable 208A moves from the second location 220 to the first location 218 or the third location 222. In accordance with another embodiment, the second input may be transmitted to the actuation mechanism 206 automatically based on detection of the disengagement.

Figure 3:
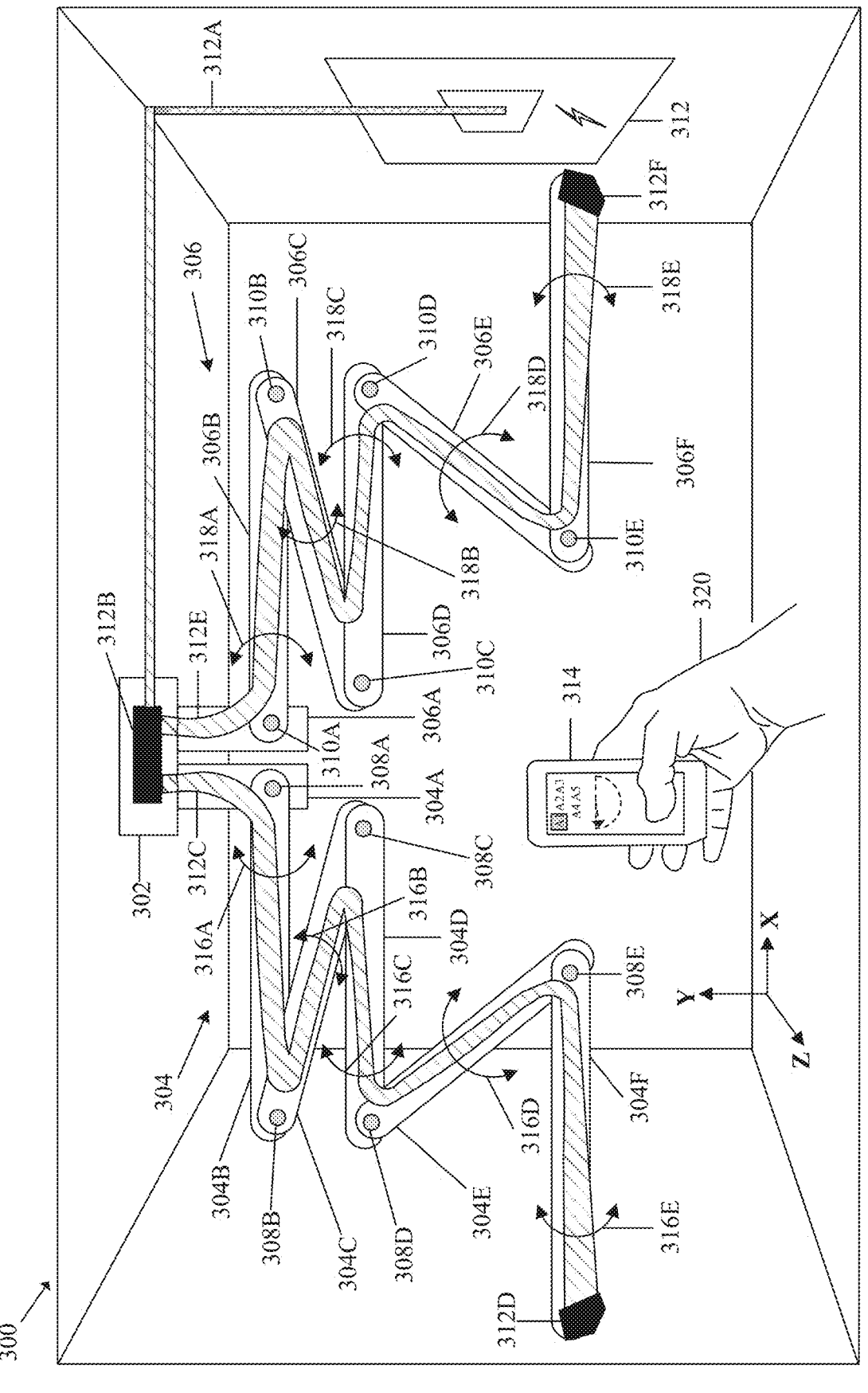
FIG. 3 is an exemplary scenario diagram that illustrates arms of a cable holding unit, in accordance with an embodiment of the disclosure.

FIG. 3 is an exemplary scenario diagram that illustrates arms of a cable holding unit, in accordance with an embodiment of the disclosure. FIG. 3 is explained in conjunction with elements from FIG. 1, FIG. 2A, FIG. 2B, FIG. 2C, and FIG. 2D. With reference to FIG. 3, there is shown an exemplary environment 300 (for example, a garage or a parking space) that includes a charging apparatus. The charging apparatus may include a support structure 302, a pair of cable holding units (for example, arms or manipulators), viz., a first arm 304 and a second arm 306, a pair of actuation mechanisms, viz., a first actuation mechanism (i.e., a first set of actuators 308A . . . 308E) and a second actuation mechanism (i.e., a second set of actuators 310A . . . 310E), a power supply unit 312 (for example, an EVSE), and an electronic device 314. The electronic device 314 may be an exemplary implementation of the electronic device 106 of FIG. 1 and the functionality of the electronic device 314 may be identical to that of the electronic device 106. There is further shown a user 320.

In accordance with an embodiment, the support structure 302 may be disposed on a roof structure of the environment 300. In some embodiments, the support structure 302 may be disposed on a horizontal structure that may be different from the roof structure and may be substantially parallel to the roof structure and a floor surface of the environment 300. The first arm 304 and the second arm 306 may be disposed on the support structure 302. The support structure 302 may act as a mount for the first arm 304 and the second arm 306.

In accordance with an embodiment, the first arm 304 (i.e., a first cable holding unit) may be a mechanical arm that may include a first series of jointed segments. The first series of jointed segments may include a first segment 304A, a second segment 304B, a third segment 304C, a fourth segment 304D, a fifth segment 304E, and a sixth segment 304F). Similarly, the second arm 306 (i.e., a second cable holding unit) may be a mechanical arm that includes a second series of jointed segments. The second series of jointed segments may include a seventh segment 306A, an eighth segment 306B, a ninth segment 306C, a tenth segment 306D, an eleventh segment 306E, and a twelfth segment 306F). A combined length of the first series of jointed segments may equal a length of a first cable passage. Similarly, a combined length of the second series of jointed segments may equal a length of a second cable passage.

Each of the first arm 304 and the second arm 306 may include a distal end and a free end. The distal end of the first arm 304 may correspond to the first segment 304A and the free end of the first arm 304 may correspond to the sixth segment 304F. Similarly, the distal end of the second arm 306 may correspond to the seventh segment 306A and the free end of the second arm 306 may correspond to the twelfth segment 306F. The distal end of the first arm 304 (i.e., the first segment 304A) may be pivotally coupled to the support structure 302. The distal end of the second arm 306 (i.e., the seventh segment 306A) may be pivotally coupled to the support structure 302.

In accordance with an embodiment, the first set of actuators 308A . . . 308E may include a first actuator 308A, a second actuator 308B, a third actuator 308C, a fourth actuator 308D, and a fifth actuator 308E. The first actuator 308A may be coupled to the first segment 304A and the second segment 304B. The second actuator 308B may be coupled to the second segment 304B and the third segment 304C. The third actuator 308C may be coupled to the third segment 304C and the fourth segment 304D. The fourth actuator 308D may be coupled to the fourth segment 304D and the fifth segment 304E. The fifth actuator 308E and may be coupled to the fifth segment 304E and the sixth segment 304F. The first actuator 308A may facilitate maneuvering of the second segment 304B. The second actuator 308B, the third actuator 308C, the fourth actuator 308D, and the fifth actuator 308E may facilitate maneuvering of the third segment 304C, the fourth segment 304D, the fifth segment 304E and the sixth segment 304F, respectively.

The second set of actuators 310A . . . 310E may include a sixth actuator 310A, a seventh actuator 310B, an eighth actuator 310C, a ninth actuator 310D, and a tenth actuator 310E. The sixth actuator 310A may be coupled to the seventh segment 306A and the eighth segment 306B. The seventh actuator 310B may be coupled to the eighth segment 306B and the ninth segment 306C. The eighth actuator 310C may be coupled to the ninth segment 306C and the tenth segment 306D. The ninth actuator 310D may be coupled to the tenth segment 306D and the eleventh segment 306E. The tenth actuator 310E may be coupled to the eleventh segment 306E and the twelfth segment 306F. The sixth actuator 310A may facilitate maneuvering of the eighth segment 306B. The seventh actuator 310B, the eighth actuator 310C, the ninth actuator 310D, and the tenth actuator 310E may facilitate maneuvering of the ninth segment 306C, the tenth segment 306D, the eleventh segment 306E and the twelfth segment 306F, respectively.

In accordance with an embodiment, the power supply unit 312 may include an electric cable 312A. A first end of the electric cable 312A may be electrically coupled to an electric cable splitter 312B and a second end of the electric cable 312A may be electrically coupled to the power supply unit 312. A portion of the electric cable 312A may be disposed on the roof structure and another portion may be disposed on a side wall of the environment 300 such that the second end of the electric cable 312A extends to the power supply unit 312. The electric cable splitter 312B may be 2-way splitter that may receive an input electric power signal from the power supply unit 312 via the electric cable 312A. The electric cable splitter 312B may losslessly split the input power signal into two output electric power signals. The electric cable splitter 312B may be disposed on the support structure 302 and may be electrically coupled to a first electric cable 312C and a second electric cable 312E. The first electric cable 312C and the second electric cable 312E may act as carriers of two output electric power signals, which may be used to charge electric vehicles.

In some embodiments, the charging apparatus may not include the electric cable splitter 312B. Instead, the power supply unit 312 may include two sockets and an electric cable may be electrically coupled to each socket, Thus the power supply unit 312 may include two electric cables. The first ends of each of the two electric cables may be electrically coupled to charging connectors.

In accordance with an embodiment, the first electric cable 312C may be disposed on the first cable passage (i.e., i.e., an open passage along the length of the first arm 304). A first end of the first electric cable 312C may be electrically coupled to a first charging connector 312D and a second end of the first electric cable 312C may be electrically coupled to the electric cable splitter 312B. Similarly, the second electric cable 312E may be disposed on the second cable passage (i.e., along the length of the second arm 306). A first end of the second electric cable 312E may be electrically coupled to a second charging connector 312F and a second end of the second electric cable 312E may be electrically coupled to the electric cable splitter 312B. The second end of the first electric cable 312C may be disposed on the first segment 304A (i.e., at the distal end of the first arm 304) that constitutes the first cable passage. Similarly, the second end of the second electric cable 312E may be disposed on the seventh segment 306A (i.e., at the distal end of the second arm 306) that constitutes the second cable passage. The free end of the first arm 304 (corresponding to the sixth segment 304F), which is a part of the first cable passage, may suspend the first end of the first electric cable 312C. Similarly, the free end of the second arm 306 (corresponding to twelfth segment 306F), which is a part of the second cable passage, may suspend the first end of the second electric cable 312E.

In accordance with an embodiment, the first series of jointed segments (i.e., the first segment 304A, the second segment 304B, the third segment 304C, the fourth segment 304D, the fifth segment 304E, and the sixth segment 304F) may be maneuvered based on movement of the first set of actuators 308A . . . 308E. The maneuvering of the at least one segment of the first series of jointed segments may lead to displacement of the first end of the first electric cable 312C such that the first charging connector 312D is guided to a location that is proximal to a charging port an electric vehicle. Similarly, the second series of jointed segments (i.e., the seventh segment 306A, the eighth segment 306B, the ninth segment 306C, the tenth segment 306D, the eleventh segment 306E, and the twelfth segment 306F) may be maneuvered based on movement of the second set of actuators 310A . . . 310E. The maneuvering of the at least one segment of the second series of jointed segments may lead to a maneuvering of the first end of the second electric cable 312E such that the second charging connector 312F is guided to a location that is proximal to the charging port the electric vehicle.

In accordance with an embodiment, joints connecting pairs of segments of the first series of jointed segments may allow the first arm 304 to have several degrees of freedom (for example, 316A, 316B, 316C, 316D, and 316E). Each segment of the first series of jointed segments may be individually maneuvered by an actuator of the first set of actuators 308A . . . 308E. Alternatively, multiple segments of the first series of jointed segments may be collectively maneuvered by the first set of actuators 308A . . . 308E.

Similarly, joints connecting pairs of segments of the second series of jointed segments may allow the second arm 306 to have several degrees of freedom (for example, 318A, 318B, 318C, 318D, and 318E). Each segment of the second series of jointed segments may be individually maneuvered by an actuator of the second set of actuators 310A . . . 310E or multiple segments of the second series of jointed segments may be collectively maneuvered by the second set of actuators 310A . . . 310E. For example, an actuator between a pair of segments of the first series of jointed segments or the second series of jointed segments may allow the pair of jointed segments to have at least 3 or at most 6 degrees of freedom.

The movement of an actuator of the first set of actuators 308A . . . 308E or of the second set of actuators 310A . . . 310E may be controlled by the electronic device 314. The electronic device 314 may be configured to transmit a first input to at least one actuator of the first set of actuators 308A . . . 308E to control the maneuver of at least one segment of the first series of jointed segments. Similarly, the electronic device 314 may transmit a second input to the at least one actuator of the second set of actuators 310A . . . 310E to control the maneuver of at least one segment of the second series of jointed segments. The first input or the second input may be transmitted based on reception of an input from the user 320 associated with the electronic device 314.

In some embodiments, the electronic device 314 may be further configured to determine a user location on a floor surface of the environment 300. The user location may correspond to a location of the electronic device 314 (since the user 320 may be expected to hold the electronic device 314). Once the user location is determined, the electronic device 314 may transmit an instruction to an actuation mechanism to move the first end of the first electric cable 312C or the first end of the second electric cable 312E from a first location to the user location. The actuation mechanism may correspond to the first actuation mechanism comprising the first set of actuators 308A . . . 308E or the second actuation mechanism comprising the second set of actuators 310A . . . 310E. The user 320 may be situated at a location that is proximal to a charging port of the electric vehicle. The first location may correspond to a location of the first end of the first electric cable 312C or a location of the first end of the second electric cable 312E. The instruction may include direction of movement of at least one actuator of the first set of actuators 308A . . . 308E or the second set of actuators 310A . . . 310E. A movement of the at least one actuator may lead to maneuvering of at least one segment of the first series of jointed segments or the second series of jointed segments such that the first end of the first electric cable 312C or the first end of the second electric cable 312E is guided to the user location (or a location proximal to a charging port of an electric vehicle).

The electronic device 314 may be further configured to track movement of the user 320 and control the first set of actuators 308A . . . 308E or the second set of actuators 310A . . . 310E to maneuver the at least one segment of the first series of jointed segments or the second series of jointed segments such that the first end of the first electric cable 312C or the first end of the second electric cable 312E is guided to the user location.

Figure 4A:
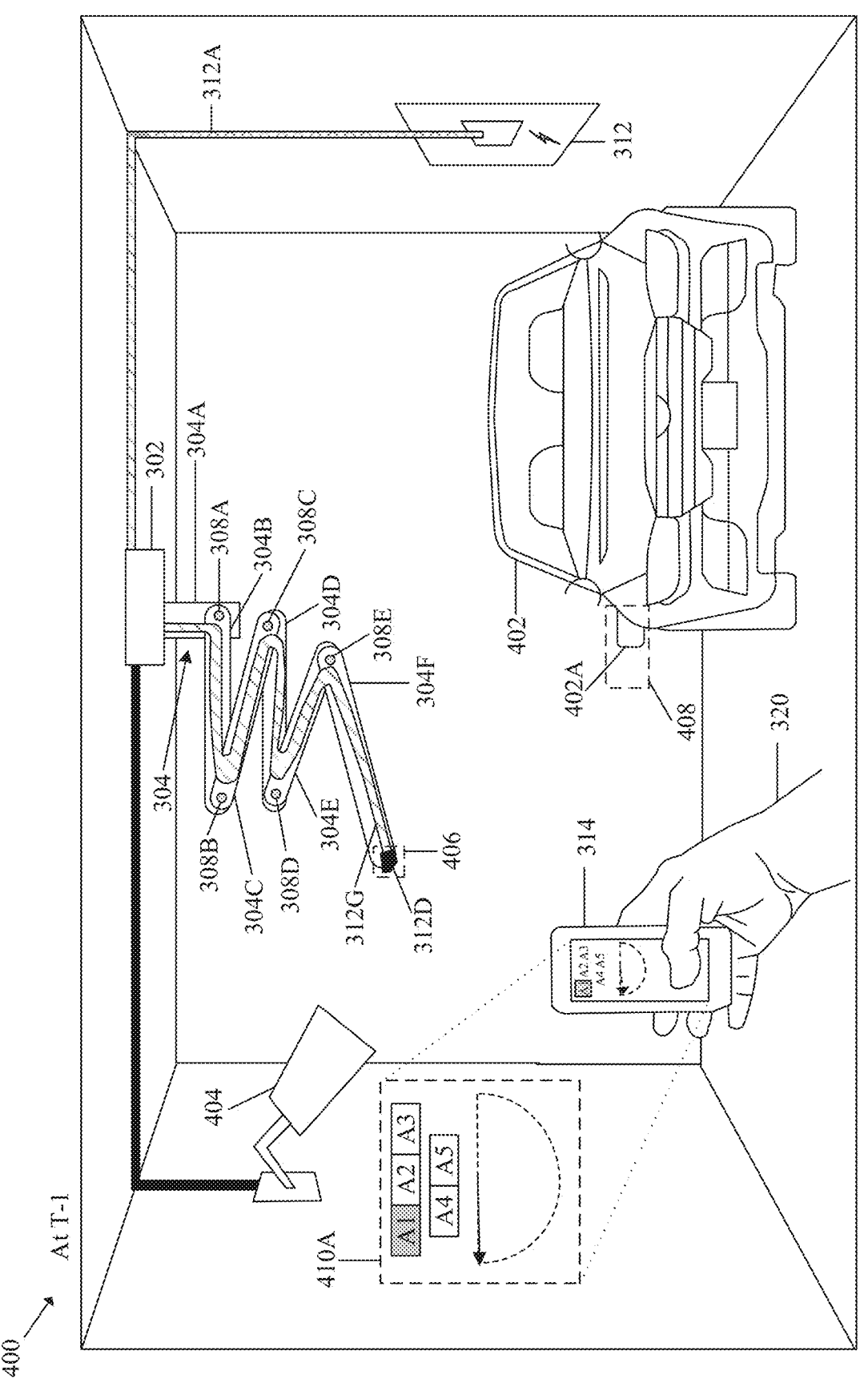
FIGS. 4A and 4B are exemplary scenario diagrams that collectively illustrate an extension of an end of an electric cable electrically coupled to a charging connector, in accordance with an embodiment of the disclosure.
Figure 4B:
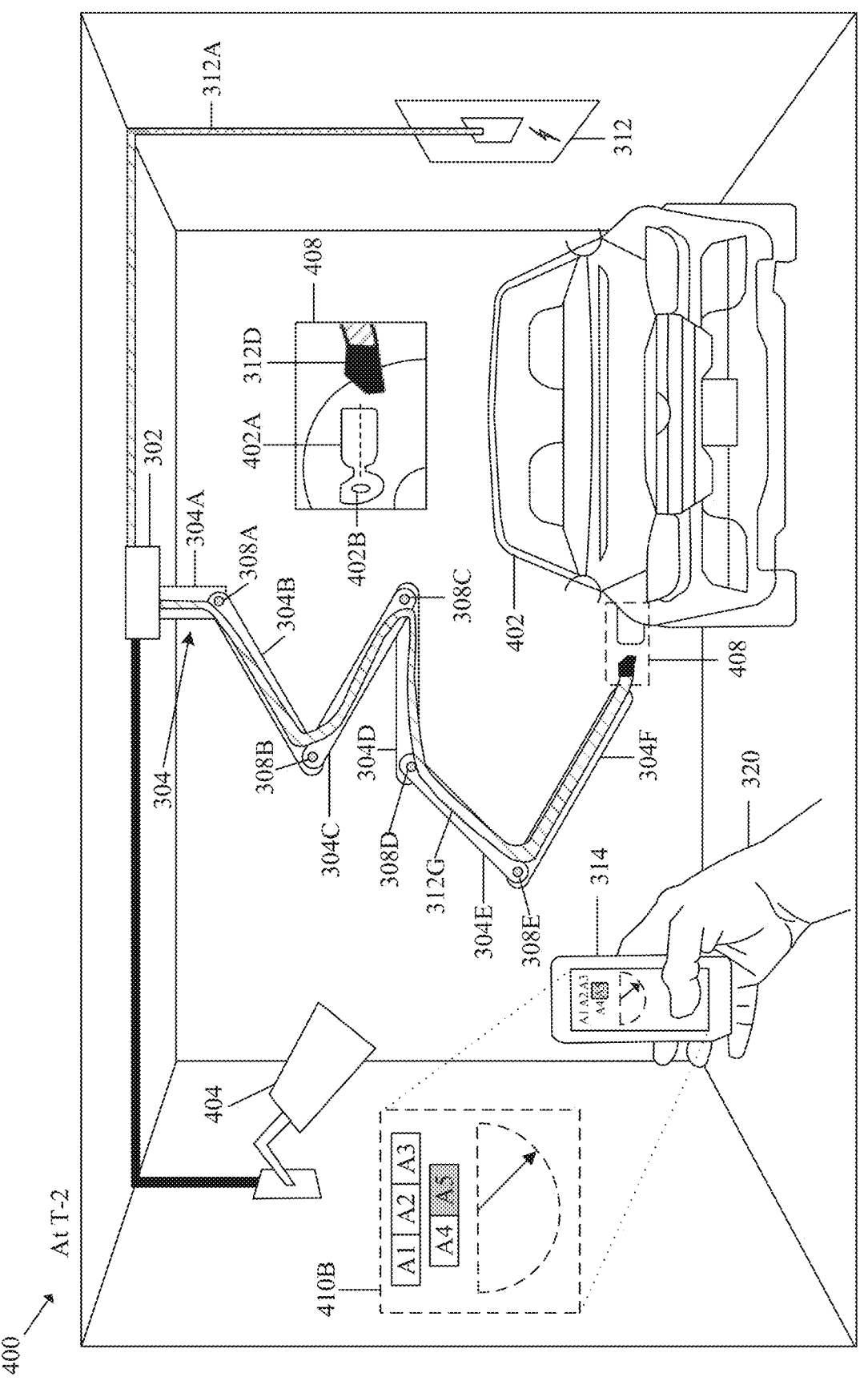

FIGS. 4A and 4B are exemplary scenario diagrams that collectively illustrate an extension of an end of an electric cable electrically coupled to a charging connector, in accordance with an embodiment of the disclosure. FIGS. 4A and 4B are explained in conjunction with elements from FIG. 1, FIG. 2A, FIG. 2B, FIG. 2C, FIG. 2D, and FIG. 3. With reference to FIGS. 4A and 4B, there is shown an environment 400 (for example, a garage or a parking lot) that includes a charging apparatus. The charging apparatus may include the support structure 302, the first arm 304 (i.e., the first series of jointed segments), the first set of actuators 308A . . . 308E, the power supply unit 312, and the electronic device 314 of FIG. 3. In the environment 400 there is further shown an electric vehicle 402. The charging apparatus may further include an imaging sensor 404. The electric vehicle 402 may include a charging lid 402A and a charging port 402B (as shown in the exemplary scenario 400B in FIG. 4B). The functionality of the imaging sensor 404 may be identical to that of the imaging sensor 212 of FIGS. 2A-2D.

The charging apparatus is shown to include a single imaging sensor 404 merely as an example. In some embodiments, the charging apparatus may include multiple imaging sensors to acquire images from one or more viewpoints. Such sensors may be integrated into the electronic device 314 or may be separate devices that communicate with the electronic device 314. In the environment 400, there is further shown the user 320 (see FIG. 3) who may be associated with the electronic device 314.

In accordance with an embodiment, the power supply unit 312 may include the electric cable 312A. A first portion 312G of the electric cable 312A may be disposed on the first cable passage along the length of the first arm 304 (i.e., along a length of the first series of jointed segments). The remaining portion of the electric cable 312A may be disposed on the roof structure or other support structures such as a side wall of the environment 400. A first end of the electric cable 312A (as part of the first portion 312G of the electric cable 312A) may be electrically coupled to the first charging connector 312D and a second end of the electric cable 312A may be electrically coupled to the power supply unit 312. The free end of the first arm 304 (i.e., the sixth segment 304F which form a part of the first cable passage) may suspend the first end of the electric cable 312A to a first location 406. The first portion 312G of the electric cable 312A may be displaced from the first location 406 to a second location 408 (as shown in the exemplary scenario 400B in FIG. 4B) by maneuvering the first series of jointed segments (i.e., the first segment 304A, the second segment 304B, the third segment 304C, the fourth segment 304D, the fifth segment 304E, and the sixth segment 304F). The first series of jointed segments may be maneuvered based on a movement of the first set of actuators 308A . . . 308E.

At time instant T-1, the first portion 312G of the electric cable 312A may be disposed on the first cable passage along the length of the first arm 304 (i.e., the first cable passage) such that the first end of the electric cable 312A extends to the first location 406.

In accordance with an embodiment, the electronic device 314 (for example, a smartphone) may receive at least one user input from the user 320. The electronic device 314 may control a display screen of the electronic device 314 to render a user interface 410A for reception of the at least one user input. The at least one user input may instruct the electronic device 314 to move the charging connector 312D towards the charging port 402B of the electric vehicle 402. For example, at least one user input may indicate a direction towards which at least one segment of the first series of jointed segments needs to be maneuvered to displace the first portion 312G of the electric cable 312A from the first location 406 to the second location 408. Such a segment, if maneuvered in the direction, may cause the first end of the electric cable 312A (electrically coupled to the charging connector 312D) to move towards the location of the charging port 402B.

Based on the reception of the at least user input, the electronic device 314 may be configured to control the imaging sensor 404 to acquire an image of the electric vehicle 402 and transmit the captured image to the electronic device 314. The imaging sensor 404 may be required to include the charging port 402B of the electric vehicle 402 in a field-of-view of the imaging sensor 404 while capturing the image.

The electronic device 314 may be further configured to determine the location of the charging port 402B based on the captured image. The location of the charging port 402B may correspond to 3D coordinates of the charging port 402B in the environment 400 with respect to an origin. In accordance with an embodiment, the location of the charging port 402B in the environment 400 may be determined based on recognition of a model or a make of the electric vehicle 402. Alternatively, the location of a charging port for the model or the make of the electric vehicle 402 may be stored on the electronic device 314. The recognition may include, for example, an application of a neural network (i.e., a pre-trained object detector stored on the electronic device 314) on the captured image. The functionality of the neural network may be identical to that of the neural network stored on the electronic device 210.

The electronic device 314 may be further configured to convert the determined location (i.e., in-image location) of the charging port 402B into the location (i.e., a 3D location) of the charging port 402B in the environment 400. The conversion may be based on 3D coordinates of the imaging sensor 404 in the environment 400, 3D coordinates of the first location 406 in the environment 400, and an in-image location of the charging port 402B (as indicated in the captured image of the electric vehicle 402). For example, the location of the charging port 402B (determined based on the position of the charging port 402B in the electric vehicle 402) may be proximal to the second location 408.

At time instant T-2, the electronic device 314 may be further configured to generate a first input based on the location of the charging port 402B in the environment 400. In accordance with an embodiment, the electronic device 314 may be configured to transmit the first input to at least one actuator of the first set of actuators 308A . . . 308E. The first input may include at least one direction of movement of the at least one actuator. The first input may cause the at least one actuator of the first actuation mechanism (i.e., the first set of actuators 308A . . . 308E) to maneuver the first series of jointed segments (i.e., the first segment 304A, the second segment 304B, the third segment 304C, the fourth segment 304D, the fifth segment 304E, and the sixth segment 304F) of the first arm 304. The maneuver may cause the first portion 312G of the electric cable 312A to move along with the first set series of joined segments such that the first end of the electric cable 312A (electrically coupled to the first charging connector 312D) moves from the first location 406 to the second location 408. Thus, the first charging connector 312D may be guided towards the charging port 402B of the electric vehicle 402. The second location 408 may correspond to a location proximal to the location of the charging port 402B.

At the second location 408, the first charging connector 312D may be horizontally aligned with the location of the charging port 402B. The first charging connector 312D may be connected to the charging port 402B to charge a battery of the electric vehicle 402 once the first charging connector 312D is horizontally aligned with the location of the charging port 402B.

In some embodiments, the electronic device 314 may be configured to detect a change in state of the charging lid 402A of the charging port 402B from a locked state to an unlocked state. The detection may be based on reception of a control signal from the electric vehicle 402. The control signal may indicate that the charging lid 402A has transitioned from the locked state to the unlocked state. The electronic device 314 may transmit the first input to the first set of actuators 308A . . . 308E based on the detection of the change in the state of the charging lid 214A (from the locked state to the unlocked state).

In accordance with an embodiment, the electronic device 314 may be further configured to displace the first portion 312G of the electric cable 312A to enable the movement of the first end of the electric cable 312A. The first portion 312G of the electric cable 312A may be displaced such that the first end of the electric cable 312A (that is electrically coupled to the first charging connector 312D) moves from the second location 408 to the first location 406 or another location away from the charging port 402B. The electronic device 314 may transmit a second input to the first actuation mechanism (i.e., first set of actuators 308A . . . 308E) to displace the first portion 312G of the electric cable 312A. The second input may include at least one direction of movement of at least one actuator of the first set of actuators 308A . . . 308E. The movement of the first set of actuators 308A . . . 308E may maneuver the first series of jointed segments, which in turn, may cause the first end of the electric cable 312A to move away from the charging port 402B.

The second input may be transmitted to the first set of actuators 308A . . . 308E based on a determination of completion of a charging operation for the battery of the electric vehicle 402. In some embodiments, the electronic device 314 may detect a disengagement of the first charging connector 312D from the charging port 402B. The detection may be based on a reception of a control signal from the electric vehicle 402. The control signal may be indicative of disengagement of the first charging connector 312D from the charging port 402B. The control signal may be received when the battery of the electric vehicle 402 is completely charged or is charged to a level set by a driver of the electric vehicle 402. Based on the reception of the control signal, the second input may be transmitted.

Figure 5A:
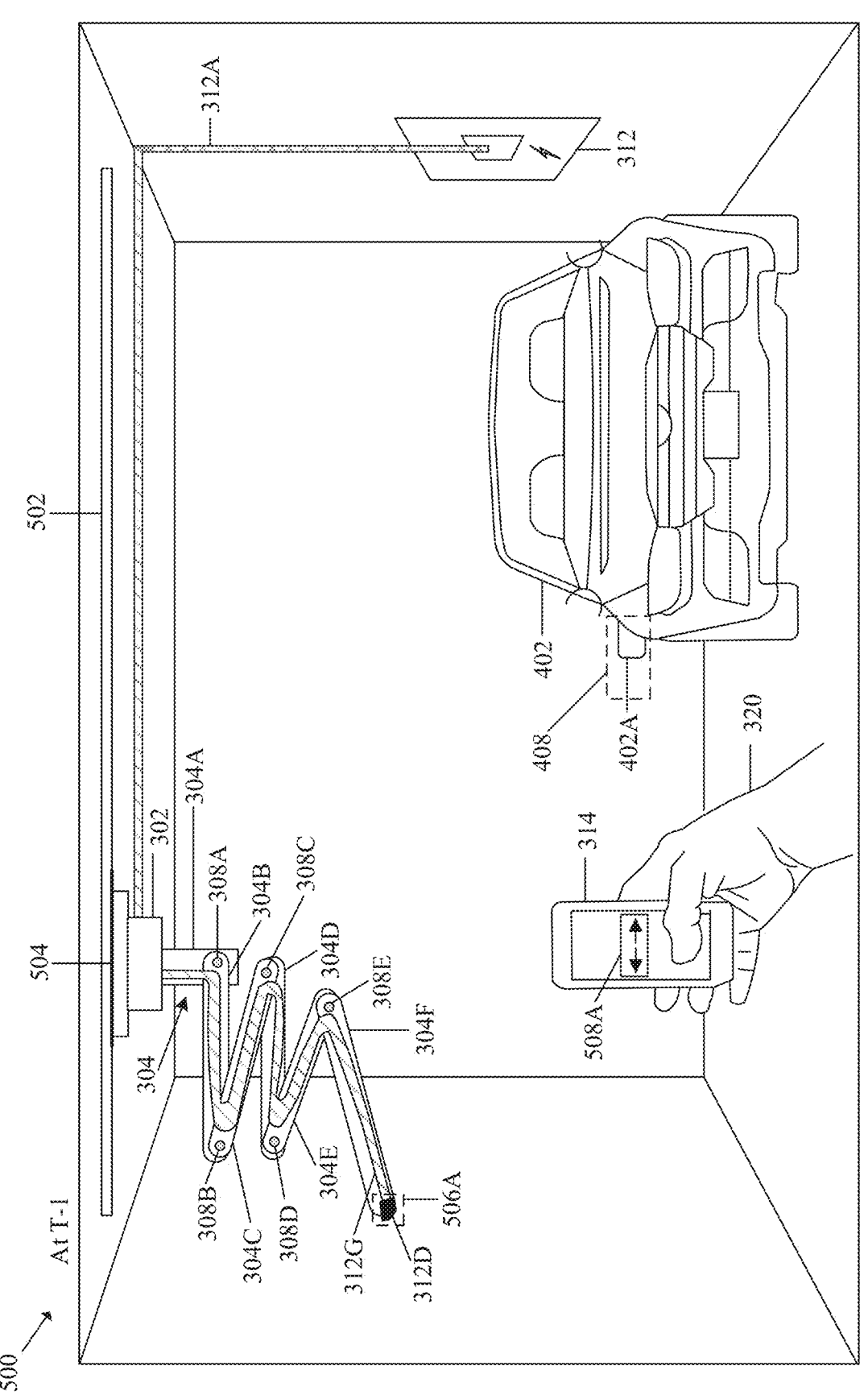
FIGS. 5A and 5B are exemplary scenario diagrams that collectively illustrate a horizontal movement of an end of the electric cable towards a charging port of an electric vehicle, in accordance with an embodiment of the disclosure.
Figure 5B:
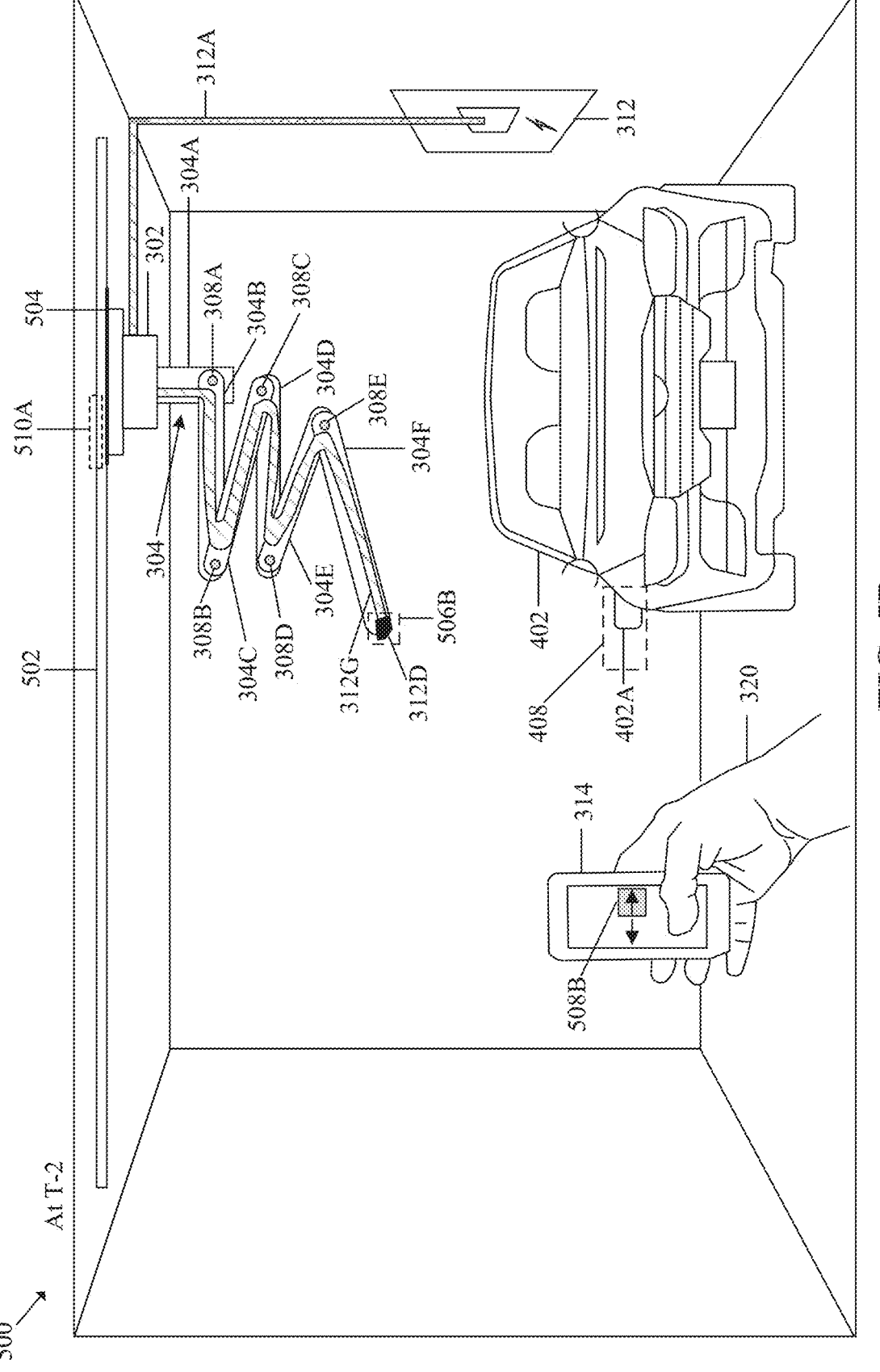

FIGS. 5A and 5B are exemplary scenario diagrams that collectively illustrate a horizontal movement of an end of the electric cable towards a charging port of an electric vehicle, in accordance with an embodiment of the disclosure. FIGS.

5A and 5B are explained in conjunction with elements from FIG. 1, FIG. 2A, FIG. 2B, FIG. 2C, FIG. 2D, FIG. 3, FIG. 4A, and FIG. 4B. With reference to FIGS. 5A and 5B, there is shown an environment 500 (for example, a garage, a parking space, or a charging station) that includes a charging apparatus. The charging apparatus may include a track 502 and an electronically actuated platform 504. The charging apparatus may further include the support structure 302, the first arm 304 (i.e., the first series of jointed segments), the first set of actuators 308A . . . 308E, the power supply unit 312, and the electronic device 314 of FIG. 3. The charging apparatus may further include the electric vehicle 402 of FIGS. 4A and 4B, which may include the charging lid 402A. In the environment 500, there is further shown the user 320 (see FIG. 3) who may be associated with the electronic device 314.

In accordance with an embodiment, the track 502 may be mounted on a roof structure of the environment 500. The electronically actuated platform 504 may be slidably disposed on the track 502. A control assembly (that includes the support structure 302, the first arm 304, and the first set of actuators 308A . . . 308E) may be suspended from the electronically actuated platform 504. In some embodiments, the control assembly may be mounted on the electronically actuated platform 504. The support structure 302 may be also disposed on the electronically actuated platform 504. The first arm 304 may be disposed on the support structure 302 and the first set of actuators 308A . . . 308E may be coupled to a first series of jointed segments of the first arm 304. The electronically actuated platform 504 may slide on the track 502 based on inputs received from the electronic device 314. The sliding of the electronically actuated platform 504 (on the track 502) may lead to a horizontal movement (for example, left-to-right or front-to-back) of the control assembly along the length of the track 502. The horizontal movement may cause the first end of the electric cable 312A to move towards the location (i.e., the second location 408) of the charging port 402B (inside the charging lid 402A) of the electric vehicle 402.

At time instant T-1, the first end of the electric cable 312A may extend to a location 506A. In accordance with an embodiment, the electronic device 314 may control a display screen of the electronic device 314 to render a user interface 508A that may include user interface elements for reception of user inputs from the user 320. The user inputs, received via the user interface elements, may include a direction of movement of the control assembly.

In accordance with an embodiment, the electronic device 314, at time instant T-2, may be configured to transmit a third input to the electronically actuated platform 504. The transmission of the third input may be based on reception of a user input via a user interface element 508B. The user input may include an instruction to move the control assembly from left to right (i.e., towards the charging port 402B of the electric vehicle 402). The user input may be received in response to a message (rendered by the electronic device 314 on the display screen) that indicates a detection of a requirement to charge a battery of the electric vehicle 402 or a detection of a transition in a state of the charging lid 402A of the charging port 402B from a locked state to an unlocked state. The transmitted third input may include a location 510A on the track 502. The electronically actuated platform 504 may slide on the track 502 to reach the location 510A based on a reception of the third input from the electronic device 314. Thus, the third input may cause the electronically actuated platform 504 to horizontally move the first end of the electric cable 312A (from the location 506A)

towards the location of the charging port 402B. The first end of the electric cable 312A may horizontally move from the location 506A to a location 506B. The location 506B may be closer to the location of the charging port 402B (i.e., the second location 408) as compared to the location 506A.

In accordance with an embodiment, the electronic device 314 may be further configured to transmit the first input to at least one actuator of the first set of actuators 308A . . . 308E. The first input may cause at least one actuator of the first set of actuators 308A . . . 308E to maneuver at least one segment of the first series of jointed segments of the first arm 304. The maneuvering may lead to a displacement of the first portion 312G of the electric cable 312A such that the first end of the electric cable 312A (that is electrically coupled to the first charging connector 312D) moves from the location 506B to the second location 408 (i.e., proximal to a location of the charging port 402B).

Figure 5C:
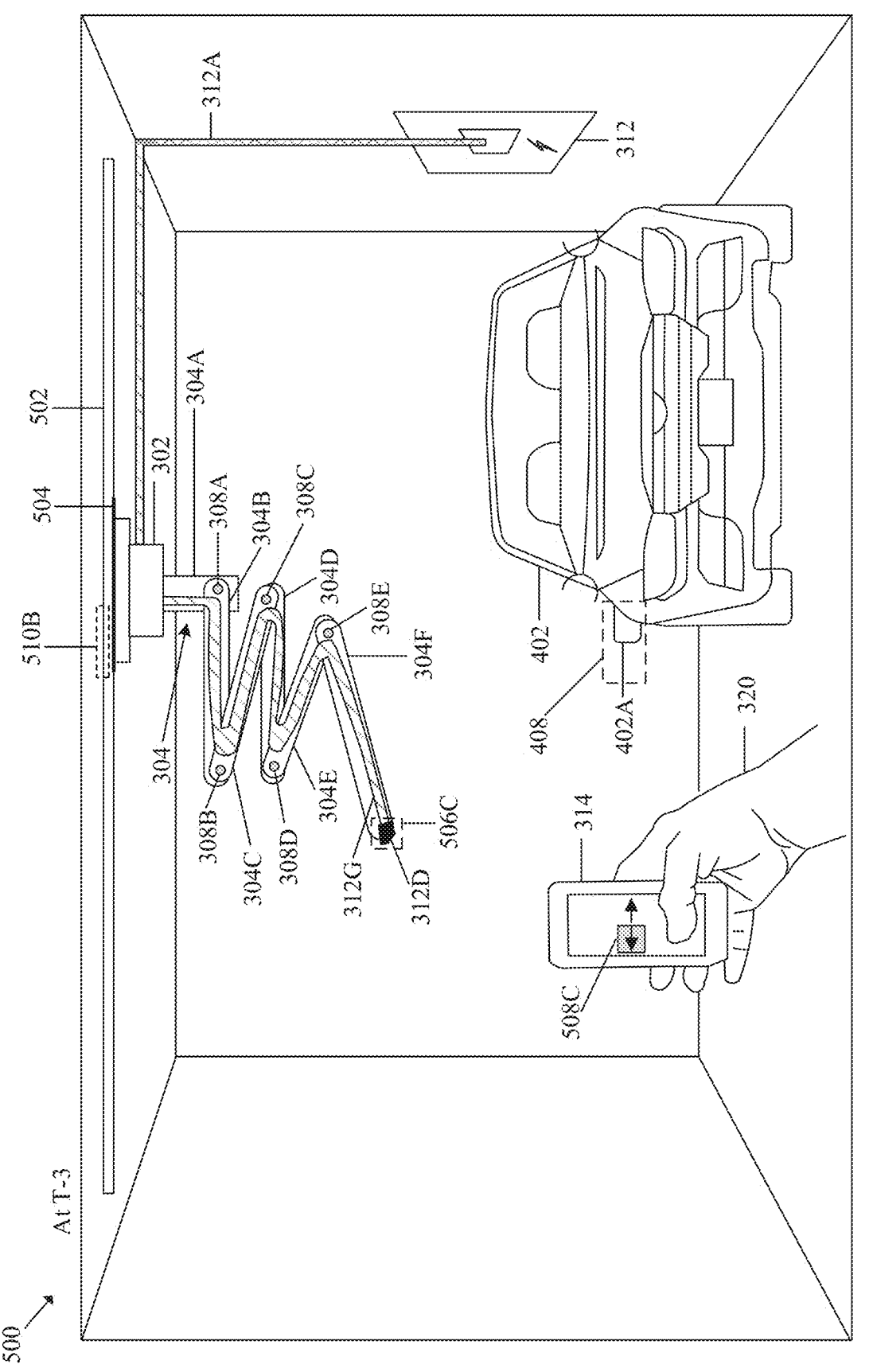
FIG. 5C is an exemplary scenario diagram that illustrates a horizontal movement of an end of the electric cable away from a charging port of an electric vehicle, in accordance with an embodiment of the disclosure.

FIG. 5C is an exemplary scenario diagram that illustrates a horizontal movement of an end of the electric cable away from a charging port of an electric vehicle, in accordance with an embodiment of the disclosure. FIG. 5C is explained in conjunction with elements from FIG. 1, FIG. 2A, FIG. 2B, FIG. 2C, FIG. 2D, FIG. 3, FIG. 4A, FIG. 4B, FIG. 5A, and FIG. 5B. With reference to FIG. 5C, there is shown an exemplary scenario 500C. In the exemplary scenario 500C, there is shown the environment 500 (for example, a garage or a parking space) that includes the charging apparatus of FIGS. 5A and 5B.

Prior to time instant T-3, the first end of the electric cable 312A may extend to the location 506B (see FIG. 5B). The first end of the electric cable 312A may be required to be maneuvered away from the location 506B. In order to enable the maneuver, in some embodiments, the electronic device 314 may be configured to transmit the second input to at least one actuator of the first set of actuators 308A . . . 308E. The first set of actuators 308A . . . 308E may maneuver, based on the second input, at least one segment of the first series of jointed segments of the first arm 304. The second input may be transmitted prior to the time instant T-3. The maneuvering of such segment(s) may lead to a displacement of the first portion 312G of the electric cable 312A from the second location 408 (i.e., a location proximal to the charging port 402B) to the location 506B.

In accordance with an embodiment, the electronic device 314, at the time instant T-3, may be configured to transmit a fourth input to the electronically actuated platform 504. The transmission of the fourth input may be based on reception of a user input via a user interface element 508C. The user input may include an instruction to move the control assembly from right to left (i.e., away from the charging port 402B). The user input may be received in response to a message (rendered by the electronic device 314 on the display screen) that indicates a completion of a charging operation for the battery of the electric vehicle 402. The transmitted fourth input may include a location 510B on the track 502. The electronically actuated platform 504 may slide on the track 502 from the location 510A (see FIG. 5B) to the location 510B, based on a reception of the fourth input from the electronic device 314. Thus, the fourth input may cause the electronically actuated platform 504 to horizontally move the first end of the electric cable 312A (from the location 506B) away from the location of the charging port 402B. The first end of the electric cable 312A may horizontally move from the location 506B to a location 506C. The location 506C may be farther away from the location of the charging port 402B (i.e., the second location 408) as compared to the location 506B.

FIG. 6 is a flowchart that illustrates exemplary operations for charging of an electric vehicle using an overhead charging apparatus, in accordance with an embodiment of the disclosure. With reference to FIG. 6, there is shown a flowchart 600. The flowchart 600 is described in conjunction with elements from FIG. 1, FIG. 2A, FIG. 2B, FIG. 2C, FIG. 2D, FIG. 3, FIG. 4A, FIG. 4B, FIG. 5A, FIG. 5B, and FIG. 5C. The operations 602 and 604 may be implemented, for example, by the electronic device 106 of FIG. 1. The operations of the flowchart 600 may start at 602 and proceed to 604.

At 604, a charging apparatus may be activated. The electronic device 106 may be configured to activate the charging apparatus. The electronic device 106 may be a part of the charging apparatus. Upon activation, the charging apparatus may be enabled to receive inputs from the electronic device 106. The charging apparatus may be activated remotely using the electronic device 106. Additionally, or alternatively, the charging apparatus may be activated when an electric vehicle enters an operational space (e.g., a garage or a parking lot) of the charging apparatus. Additionally, or alternatively, the charging apparatus may be activated based on a detection of the electric vehicle in the environment using sensors installed in the environment. For example, the sensors may indicate to the electronic device 106 an arrival of an electric vehicle in the environment. The indication may be transmitted by the sensors based on detection of an opening of a charging lid on the body of the electric vehicle. Details of the charging apparatus are described in FIG. 1, for example.

At 606, a first input may be transmitted to an actuation mechanism 112 of the charging apparatus. The electronic device 106 may transmit the first input to the actuation mechanism 112 of the charging apparatus. The reception of the first input (by the actuation mechanism 112) may cause the actuation mechanism 112 to displace the first portion 118 of the electric cable 114 from the cable passage. The displacement of the first portion 118 may cause the first end of the electric cable 114 to move from the first location 120 to the second location 122 (that may be proximal to a location of the charging port 126 of the electric vehicle 124. Control may pass to the end.

Although the flowchart 600 is illustrated as discrete operations, such as 604 and 606, the disclosure is not so limited. Accordingly, in certain embodiments, such discrete operations may be further divided into additional operations, combined into fewer operations, or eliminated, depending on the particular implementation without detracting from the essence of the disclosed embodiments.

FIG. 7 is a block diagram that illustrates an exemplary electronic device of an overhead charging apparatus, in accordance with an embodiment of the disclosure FIG. 7 is explained in conjunction with elements from FIG. 1, FIG. 2A, FIG. 2B, FIG. 2C, FIG. 2D, FIG. 3, FIG. 4A, FIG. 4B, FIG. 5A, FIG. 5B, FIG. 5C, and FIG. 6. With reference to FIG. 7, there is shown a block diagram 700 of the electronic device 106. The electronic device 106 may include circuitry 702, a memory 704, an input/output (I/O) device 706, and a network interface 708. The circuitry 702 may be communicatively coupled to the memory 704, the I/O device 706, and the network interface 708, through wired or wireless communication of the electronic device 106. In at least one embodiment, the memory 704 may store a neural network model 710. In at least one embodiment, the I/O device 706 may include a display device 712.

The circuitry 702 may include suitable logic, circuitry, and/or interfaces that may be configured to execute program instructions associated with different operations to be executed by the electronic device 106. The set of operations may include, but are not limited to, activation of a charging apparatus and transmission a first input to the actuation mechanism. The circuitry 702 may include any suitable special-purpose or general-purpose computer, computing entity, or processing device including various computer hardware or software modules and may be configured to execute instructions stored on any applicable computer-readable storage media. For example, the circuitry 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 702 may include any number of processors configured to, individually or collectively, perform or direct performance of any number of operations of the electronic device 106, as described in the present disclosure. Examples of the circuitry 702 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 704 may include suitable logic, circuitry, interfaces, and/or code that may be configured to store the set of instructions executable by the circuitry 702. The instructions may be associated with the control of motion of the actuation mechanism 112 or an electronically actuated platform on which the control assembly 102 is disposed. Examples of implementation of the memory 704 may include, but are not limited to, Random Access Memory (RAM), Read Only Memory (ROM), Hard Disk Drive (HDD), a Solid-State Drive (SSD), a CPU cache, and/or a Secure Digital (SD) card.

The neural network model 710, included in the memory 704, may be a computational network or a system of artificial neurons, arranged in a plurality of layers, as nodes. The plurality of layers of the neural network model 710 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 710. Outputs of each hidden layer may be coupled to inputs of at least one node in other layers of the neural network model 710. Node(s) in the final layer may receive inputs from at least one hidden layer to output a result. The number of layers and the number of nodes in each layer may be determined from hyper-parameters of the neural network model 710. Such hyper-parameters may be set before, while training, or after training the neural network model 710 on a training dataset.

Each node of the neural network model 710 may correspond to a mathematical function (e.g., a sigmoid function or a rectified linear unit) with a set of parameters, tunable during training of the neural network model 710. The set of parameters may include, for example, a weight parameter, a regularization parameter, and the like. Each node may use the mathematical function to compute an output based on one or more inputs from nodes in other layer(s) (e.g., previous layer(s)) of the neural network model 710. All or some of the nodes of the neural network model 710 may correspond to same or a different mathematical function. In training of the neural network model 710, one or more parameters of each node of the neural network model 710 may be updated based on whether an output of the final layer for a given input (from the training dataset) matches a correct result (based on a loss function for the neural network model 710). The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

The neural network model 710 may include electronic data, which may be implemented as, for example, a software component of an application executable on the electronic device 106. The neural network model 710 may rely on libraries, external scripts, or other logic/instructions for execution by a processing device, such as the circuitry 702. The neural network model 710 may function as a machine learning model with a capability to perform vehicle image recognition based on object detection. The neural network model 710 may include code and routines configured to enable a computing device, such as the circuitry 702, to recognize features and attributes of a vehicle based on an image of the vehicle. The circuitry 702 may apply the neural network model 710 on at least one image of the vehicle, captured by an image capture device (for example, the imaging sensor 212 or the imaging sensor 404).

Additionally, or alternatively, the neural network model 710 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 710 may be implemented using a combination of hardware and software. Examples of the neural network model 710 may include, but are not limited to, a deep neural network (DNN), a convolutional neural network (CNN), an artificial neural network (ANN), a fully connected neural network, a deep Bayesian neural network, and/or a combination of such networks. (DNNs). In some embodiments, the neural network model 710 may correspond to a learning engine that may execute numerical computation techniques using data flow graphs. In certain embodiments, the neural network model 710 may be based on a hybrid architecture of multiple DNNs.

The I/O device 706 may include suitable logic, circuitry, interfaces, and/or code that may be configured to receive an input and provide an output based on the received input. The I/O device 706 may receive inputs (from a user 130) that may be indicative of direction of movement of the electric cable 114. The inputs may also be indicative of directions of rotation or maneuver of the cable holding unit 110. The I/O device 706 may render user interface elements for reception of the user inputs. The I/O device 706 may further render messages that may be indicative of status of charging of a battery of the electric vehicle 124, state of charge of the battery, or state (i.e., locked or unlocked) of a charging lid of the electric vehicle 124. The I/O device 706 may include one or more input and output devices that may communicate with different components of the electronic device 106. The I/O device 706 may receive inputs that the execution of program instructions, by the circuitry 702, associated with different operations to be executed by the electronic device 106. Examples of the I/O device 706 may include, but are not limited to, a touch screen, a keyboard, a mouse, a joystick, a microphone, and a speaker.

In some embodiments, the I/O device 706 may include the display device 712. The display device 712 may include suitable logic, circuitry, and interfaces that may be configured to receive inputs from the circuitry 702 to render, on a display screen a user interface that includes user interface elements for reception of user inputs. In at least one embodiment, the display screen may be a resistive touch screen, a capacitive touch screen, or a thermal touch screen. The display device 712 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 708 may include suitable logic, circuitry, and interfaces that may be configured to facilitate communication between the circuitry 702, the power supply unit 104, the actuation mechanism 112, and the electric vehicle 124, via the communication network 128. The network interface 708 may be implemented by use of various known technologies to support wired or wireless communication of the electronic device 106 with the communication network 128. The network interface 708 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 708 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The functions or operations executed by the electronic device 106, as described in FIG. 1, may be performed by the circuitry 702. Operations executed by the circuitry 702 are described in detail, for example, in the FIG. 1, FIG. 2A, FIG. 2B, FIG. 2C, FIG. 2D, FIG. 3, FIG. 4A, FIG. 4B, FIG. 5A, FIG. 5B, and FIG. 5C.

For the purposes of the present disclosure, expressions, such as "including", "comprising", "incorporating", "consisting of", "have", "is", used to describe and claim the present disclosure, are intended to be construed in a non-exclusive manner, namely allowing for items, components or elements not explicitly described also to be present. Reference to the singular is also to be construed to relate to the plural. Further, all joinder references (e.g., attached, coupled, connected, o the like) are used to aid the reader's understanding of the present disclosure, and may not create limitations, particularly as to the position, orientation, or use of the systems and/or methods disclosed herein. Therefore, joinder references, if any, are to be construed broadly.

Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

What is claimed is:

1. A charging apparatus, comprising:
a control assembly comprising:
    a support structure that is disposed at a height above a floor surface;
    a cable holding unit that is disposed on the support structure, wherein the cable holding unit comprises a cable passage; and an actuation mechanism coupled to the cable holding unit, wherein the actuation mechanism includes a motor, and the actuation mechanism is configured to engage with the cable holding unit via a spindle;

a power supply unit comprising an electric cable having a first end electrically coupled to a charging connector, wherein the electric cable comprises a first portion that is disposed on the cable passage such that the first end of the electric cable retractably extends from the cable passage to a first location; and an electronic device that is communicatively coupled to the actuation mechanism and is configured to:

detect a change in state of a charging lid of a charging port of an electric vehicle from a locked state to an unlocked state; and transmit a first input to the actuation mechanism, wherein the first input is transmitted based on the detection of the change, the first input causes the actuation mechanism to displace the first portion of the electric cable from the cable passage such that the first end of the electric cable moves from the first location to a second location that is proximal to a location of the charging port of the electric vehicle, the motor is configured to rotate in one of an anti-clockwise direction or a clockwise direction based on a control signal from the electronic device, and the spindle and cable holding unit rotates based on the rotation of the motor.

2. The charging apparatus according to claim 1, wherein the support structure is disposed on one of:

a roof structure, or a horizontal structure that is different from the roof structure and is substantially parallel to the roof structure and the floor surface.

3. The charging apparatus according to claim 1, wherein the cable holding unit is spool that includes rims on two distal ends of the spool and a space between the rims form the cable passage.

4. The charging apparatus according to claim 3, wherein the first input includes a direction of rotation of the spool, and a rotation of the spool in the direction of rotation causes the first end of the electric cable to move in a vertical direction.

5. The charging apparatus according to claim 1, wherein, at the second location, the charging connector is horizontally aligned with the location of the charging port.

6. The charging apparatus according to claim 1, wherein the charging apparatus further includes an imaging sensor.

7. The charging apparatus according to claim 6, wherein the electronic device is further configured to:

receive a selection of an option to move the charging connector towards the charging port of the electric vehicle;

control the image sensor to acquire an image of the electric vehicle;

determine the location of the charging port of the electric vehicle based on the image; and generate the first input based on the determined location.

8. The charging apparatus according to claim 1, wherein the electronic device is further configured to transmit a second input to the actuation mechanism, and the second input causes the actuation mechanism to displace the first portion of the electric cable from the cable passage such that the first end of the electric cable moves from the second location to the first location or a third location that is different from the first location and the second location.

9. The charging apparatus according to claim 8, wherein the electronic device is further configured to:

detect a disengagement of the charging connector from the charging port; and generate the second input based on the disengagement.

10. The charging apparatus according to claim 1, further comprising:

a track that is mounted on a roof structure; and an electronically actuated platform that is slidably disposed on the track, wherein the control assembly is mounted on or suspended from the electronically actuated platform.

11. The charging apparatus according to claim 10, wherein the electronic device is further configured to transmit a third input to the electronically actuated platform, wherein the third input causes the electronically actuated platform to horizontally move the first end of the electric cable towards the location of the charging port of the electric vehicle.

12. The charging apparatus according to claim 10, wherein the electronic device is further configured to transmit a fourth input to the electronically actuated platform, wherein the fourth input causes the electronically actuated platform to horizontally move the first end of the electric cable away from the location of the charging port of the electric vehicle.

13. The charging apparatus according to claim 1, wherein the cable holding unit is an arm that includes a series of jointed segments, and the arm is having a distal end pivotally coupled to the support structure and a free end to suspend the first end of the electric cable.

14. The charging apparatus according to claim 13, wherein the cable passage is a space that extends along a length of the arm, and the first input causes the actuation mechanism to maneuver the series of jointed segments of the arm such that the first end of the electric cable moves from the first location to the second location.

15. The charging apparatus according to claim 1, wherein the electronic device is further configured to:

determine a user location on the floor surface; and transmit an instruction to the actuation mechanism to move the first end of the electric cable from the first location to the user location.

16. A charging apparatus, comprising:

a control assembly comprising:

a support structure that is disposed at a height above a floor surface;

a cable holding unit that is disposed on the support structure, wherein the cable holding unit comprises a cable passage; and an actuation mechanism coupled to the cable holding unit, wherein the actuation mechanism includes a motor, and the actuation mechanism is configured to engage with the cable holding unit via a spindle;

a power supply unit comprising an electric cable having a first end electrically coupled to a charging connector, wherein the electric cable comprises a first portion that is disposed in the cable passage such that the first end of the electric cable retractably extends from the cable passage to a first location; and an electronic device that is communicatively coupled to the actuation mechanism and is configured to:

detect a change in state of a charging lid of a charging port of an electric vehicle from a locked state to an unlocked state; and transmit a first input to the actuation mechanism based on the detection of the change, wherein the motor is configured to rotate in one of an anti-clockwise direction or a clockwise direction based on a control signal from the electronic device, and the spindle and cable holding unit rotates based on the rotation of the motor.

17. The charging apparatus according to claim 16, wherein the support structure is disposed on one of:

a roof structure, or a horizontal structure that is different from the roof structure and is substantially parallel to the roof structure and the floor surface.

18. A method, comprising:

activating a charging apparatus, wherein the charging apparatus comprises:

a control assembly comprising:

a support structure that is disposed at a height above a floor surface;

a cable holding unit that is disposed on the support structure, wherein the cable holding unit comprises a cable passage; and an actuation mechanism coupled to the cable holding unit, wherein the actuation mechanism includes a motor, and the actuation mechanism is configured to engage with the cable holding unit via a spindle;

a power supply unit comprising an electric cable having a first end electrically coupled to a charging connector, wherein the electric cable comprises a first portion that is disposed on the cable passage such that the first end of the electric cable retractably extends from the cable passage to a first location; and an electronic device that is communicatively coupled to the actuation mechanism and is configured to detect a change in state of a charging lid of a charging port of an electric vehicle from a locked state to an unlocked state; and transmitting a first input to the actuation mechanism, wherein the first input is transmitted based on the detection of the change, the first input causes the actuation mechanism to displace the first portion of the electric cable from the cable passage such that the first end of the electric cable moves from the first location to a second location that is proximal to a location of the charging port of the electric vehicle, the motor is configured to rotate in one of an anticlockwise direction or a clockwise direction based on a control signal from the electronic device, and the spindle and cable holding unit rotates based on the rotation of the motor.

* * * * *